US010820338B2

(12) United States Patent
Nogami et al.

(10) Patent No.: US 10,820,338 B2
(45) Date of Patent: Oct. 27, 2020

(54) USER EQUIPMENTS, BASE STATIONS AND METHODS FOR RNTI-BASED PDSCH DOWNLINK SLOT AGGREGATION

(71) Applicants: Sharp Kabushiki Kaisha, Sakai, Osaka (JP); FG Innovation Company Limited, Tuen Mun, New Territories (HK)

(72) Inventors: Toshizo Nogami, Chiba (JP); Zhanping Yin, Vancouver, WA (US)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 148 days.

(21) Appl. No.: 16/125,004

(22) Filed: Sep. 7, 2018

(65) Prior Publication Data

US 2019/0082448 A1    Mar. 14, 2019

Related U.S. Application Data

(63) Continuation of application No. PCT/US2018/049765, filed on Sep. 6, 2018.

(Continued)

(51) Int. Cl.
*H04W 72/12* (2009.01)
*H04L 5/00* (2006.01)

(52) U.S. Cl.
CPC ....... *H04W 72/1263* (2013.01); *H04L 5/0053* (2013.01); *H04L 5/0091* (2013.01); *H04W 72/1289* (2013.01)

(58) Field of Classification Search
CPC ....... H04L 5/00; H04L 5/0053; H04L 5/0091; H04W 72/1263; H04W 72/1289
See application file for complete search history.

(56) References Cited

U.S. PATENT DOCUMENTS

2004/0057407 A1* 3/2004 Balachandran ... H04W 72/0446
370/336
2014/0348093 A1* 11/2014 Ihm .................. H04L 5/0048
370/329

(Continued)

FOREIGN PATENT DOCUMENTS

EP        3032904 A1    6/2016

OTHER PUBLICATIONS

International Search Report of PCT/US2018/049765, dated Nov. 27, 2018.

(Continued)

*Primary Examiner* — Dung B Huynh
(74) *Attorney, Agent, or Firm* — ScienBiziP, P.C.

(57) ABSTRACT

A user equipment (UE) is described. The UE comprises a higher layer processor configured to acquire a dedicated radio resource control (RRC) configuration for a downlink slot aggregation, physical downlink control channel (PDCCH) receiving circuitry configured to monitor a PDCCH carrying a downlink control information (DCI) format for scheduling a physical downlink shared channel (PDSCH), and PDSCH receiving circuitry configured to receive the PDSCH. When the PDCCH is with a first radio network temporary identifier (RNTI), the downlink slot aggregation applies to the PDSCH. When the PDCCH is with a second RNTI, the downlink slot aggregation does not apply to the PDSCH.

16 Claims, 34 Drawing Sheets

Related U.S. Application Data

(60) Provisional application No. 62/556,189, filed on Sep. 8, 2017.

(56) References Cited

U.S. PATENT DOCUMENTS

| | | | | |
|---|---|---|---|---|
| 2015/0016385 A1* | 1/2015 | Aiba | H04L 5/0053 | 370/329 |
| 2015/0049695 A1* | 2/2015 | Aiba | H04L 5/0048 | 370/329 |
| 2015/0189630 A1* | 7/2015 | Aiba | H04W 72/042 | 370/329 |
| 2016/0065338 A1* | 3/2016 | Kim | H04L 5/0048 | 370/330 |
| 2016/0150462 A1* | 5/2016 | Yang | H04W 74/0833 | 370/254 |
| 2017/0201308 A1* | 7/2017 | Park | H04B 7/0417 | |
| 2017/0201968 A1* | 7/2017 | Nam | H04W 4/70 | |
| 2017/0290002 A1* | 10/2017 | Subramanian | H04W 72/0413 | |
| 2017/0325258 A1* | 11/2017 | Nogami | H04L 5/0087 | |
| 2017/0332386 A1* | 11/2017 | Li | H04L 1/1812 | |
| 2017/0367046 A1* | 12/2017 | Papasakellariou | H04W 72/042 | |
| 2018/0063865 A1* | 3/2018 | Islam | H04L 5/0091 | |
| 2018/0123767 A1* | 5/2018 | Islam | H04L 1/1864 | |
| 2018/0132229 A1* | 5/2018 | Li | H04W 72/0413 | |
| 2018/0132264 A1* | 5/2018 | Jung | H04L 5/0055 | |
| 2018/0146439 A1* | 5/2018 | Kim | H04W 52/283 | |
| 2018/0176902 A1* | 6/2018 | Huang | H04L 5/0094 | |
| 2018/0206267 A1* | 7/2018 | Islam | H04L 5/0053 | |
| 2018/0219606 A1* | 8/2018 | Ng | H04L 1/0026 | |
| 2018/0227156 A1* | 8/2018 | Papasakellariou | H04L 5/0048 | |
| 2018/0278454 A1* | 9/2018 | Islam | H04L 1/1887 | |
| 2018/0279304 A1* | 9/2018 | Lee | H04W 72/0446 | |
| 2018/0279341 A1* | 9/2018 | Yamada | H04L 25/03866 | |
| 2018/0279358 A1* | 9/2018 | Babaei | H04W 72/14 | |
| 2018/0309513 A1* | 10/2018 | Kim | H04W 72/0446 | |
| 2018/0310300 A1* | 10/2018 | Lin | H04L 5/0091 | |
| 2018/0317207 A1* | 11/2018 | Liao | H04L 5/0053 | |
| 2018/0324678 A1* | 11/2018 | Chen | H04W 48/16 | |
| 2018/0324816 A1* | 11/2018 | Islam | H04W 72/048 | |
| 2018/0367289 A1* | 12/2018 | Kim | H04L 5/1469 | |
| 2019/0007963 A1* | 1/2019 | Akkarakaran | H04W 72/0446 | |
| 2019/0044639 A1* | 2/2019 | Ouchi | H04W 52/38 | |
| 2019/0045495 A1* | 2/2019 | Chen | H04W 72/042 | |
| 2019/0116608 A1* | 4/2019 | Kim | H04W 72/04 | |
| 2019/0149365 A1* | 5/2019 | Chatterjee | H04L 25/0226 | 370/329 |
| 2019/0165904 A1* | 5/2019 | Jo | H04L 5/005 | |
| 2019/0200355 A1* | 6/2019 | Baldemair | H04L 5/001 | |
| 2019/0223164 A1* | 7/2019 | He | H04L 5/00 | |
| 2019/0230687 A1* | 7/2019 | Parkvall | H04W 88/023 | |
| 2019/0268803 A1* | 8/2019 | He | H04L 1/1816 | |
| 2019/0268926 A1* | 8/2019 | Yoshimura | H03M 13/27 | |
| 2019/0349960 A1* | 11/2019 | Li | H04L 5/0055 | |
| 2020/0008216 A1* | 1/2020 | Iyer | H04W 72/1242 | |
| 2020/0022170 A1* | 1/2020 | Ji | H04W 74/0808 | |
| 2020/0029313 A1* | 1/2020 | Parkvall | H04L 5/0094 | |

OTHER PUBLICATIONS

Wilus Inc.: "Discussion on UE behavior for group-common PDCCH for NR", 3GPP Draft, R1-1714389_UE_behaviour_related to _group-common_PDCCH_final, 3rd Generation Partnership Project (3GPP), Mobile Competence Center; 650 Route Des Lucioles; F-06921 Sophia-Antipolis Cedex, vol. RAN WG1, No. Prague, Czech Republic; Aug. 21, 2015-Aug. 25, 2015 Aug. 20, 2017 (Aug. 20, 2017); XP051317171, Retrieved -from Internet URL: http://www.3gpp.org/ftp/Meetings_3GPP_SYNC/RAN1/Docs/ [Retrieved on Aug. 20, 2017].

Wilus Inc.: "Discussion on UE behaviour for group-common PDCCH for NR", 3GPP Draft, R1-1711357_UE_behaviour_for_group-common PDCCH Final, 3rd Generation Partnership Project (3GPP), Mobile Competence Center; 650 Route Des Lucioles; F-06921 Sophia-Antipolis Cedex; France, vol. RAN WG1, No. Qingdao, P.R.China; Jun. 27, 2017-Jun. 30, 2017 Jun. 26, 2017 (Jun. 26, 2017); XP051300546, Retrieved from Internet URL: http://www.3gpp.org/ftp/Meetings_3GPP_SYNC/RAN1/Docs/ [Retrieved on Jun. 26, 2017] sections 3 and 4.

* cited by examiner

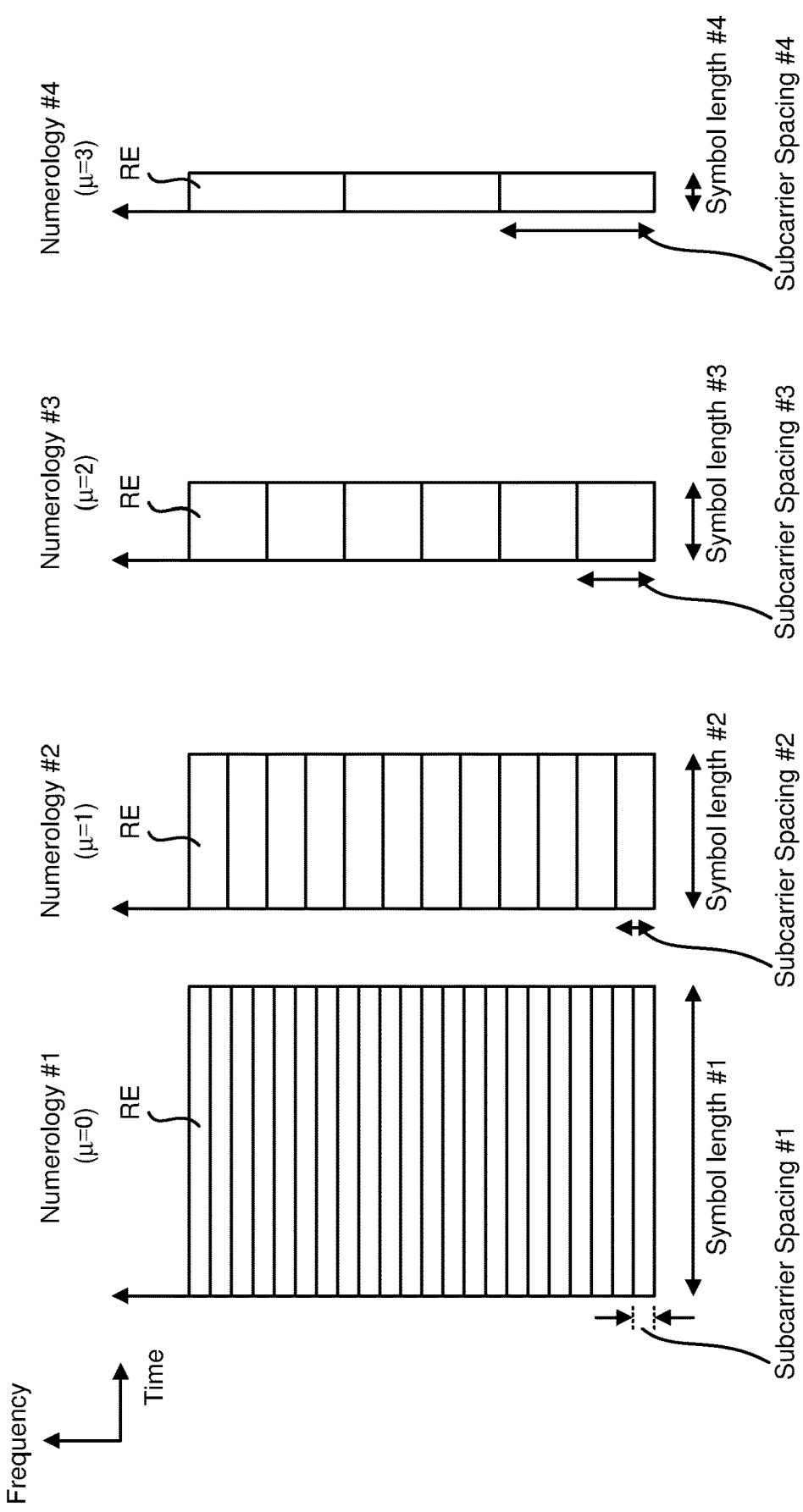

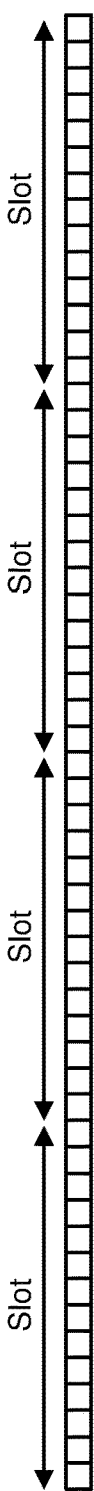
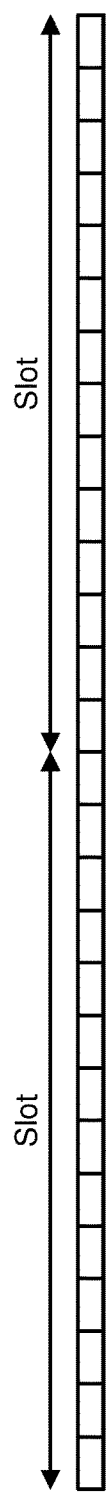
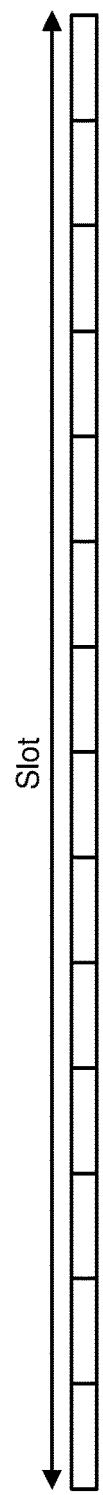
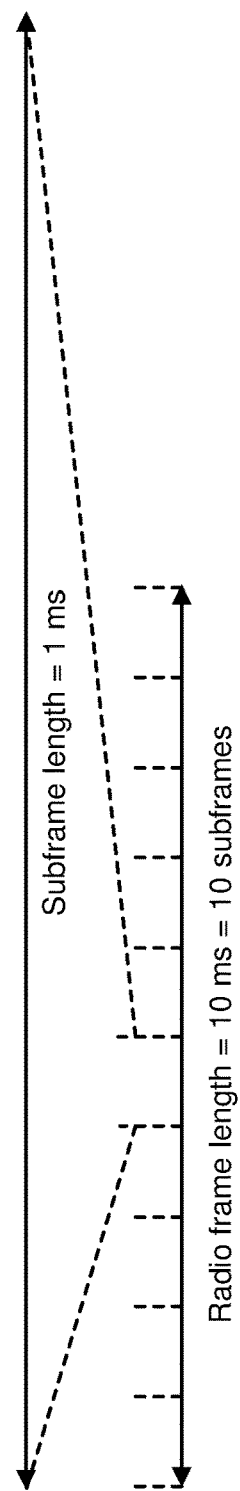
FIG. 8C — Numerology #3 (μ=3)
FIG. 8B — Numerology #2 (μ=1)
FIG. 8A — Numerology #1 (μ=0)
Subframe length = 1 ms
Radio frame length = 10 ms = 10 subframes

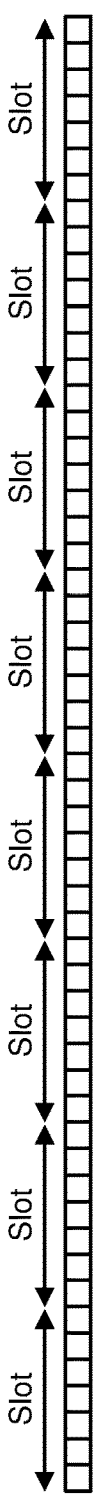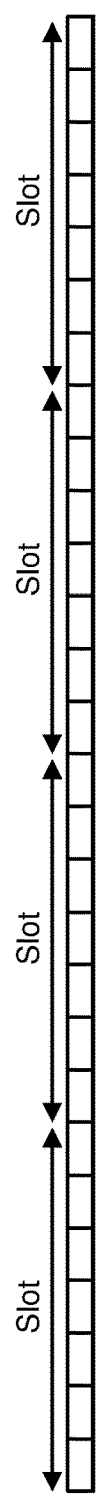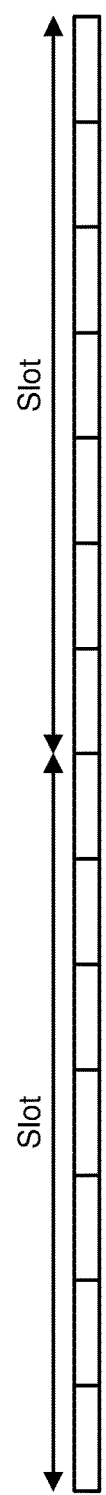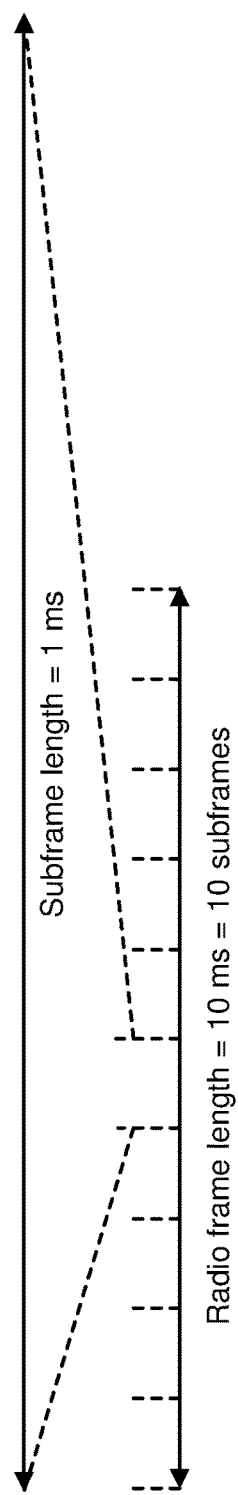
FIG. 9C  Numerology #3 (μ=3)
FIG. 9B  Numerology #2 (μ=1)
FIG. 9A  Numerology #1 (μ=0)
Subframe length = 1 ms
Radio frame length = 10 ms = 10 subframes

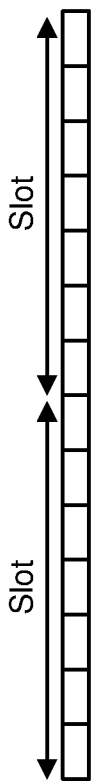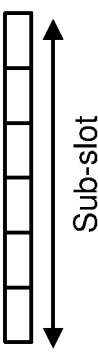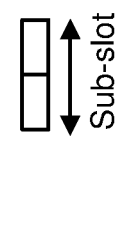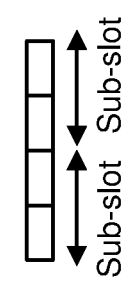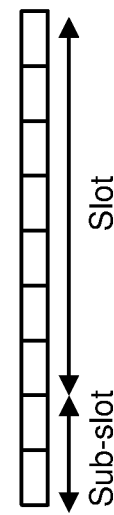
FIG. 10A  Example of slots
FIG. 10B  Example of a sub-slot
FIG. 10C  Example of a sub-slot
FIG. 10D  Example of a sub-slot
FIG. 10E  Example of an aggregation of sub-slots
FIG. 10F  Example of an aggregation of slot and sub-slot

| Value of field | Description |
|---|---|
| '00' | 1st value configured by higher layers |
| '01' | 2nd value configured by higher layers |
| '10' | 3rd value configured by higher layers |
| '11' | 4th value configured by higher layers |

FIG. 23

| Value of field | Description |
| --- | --- |
| '00' | Value is equal to a fixed value (e.g. 0, 4, etc) |
| '01' | 1st value configured by higher layers |
| '10' | 2nd value configured by higher layers |
| '11' | 3rd value configured by higher layers |

FIG. 24

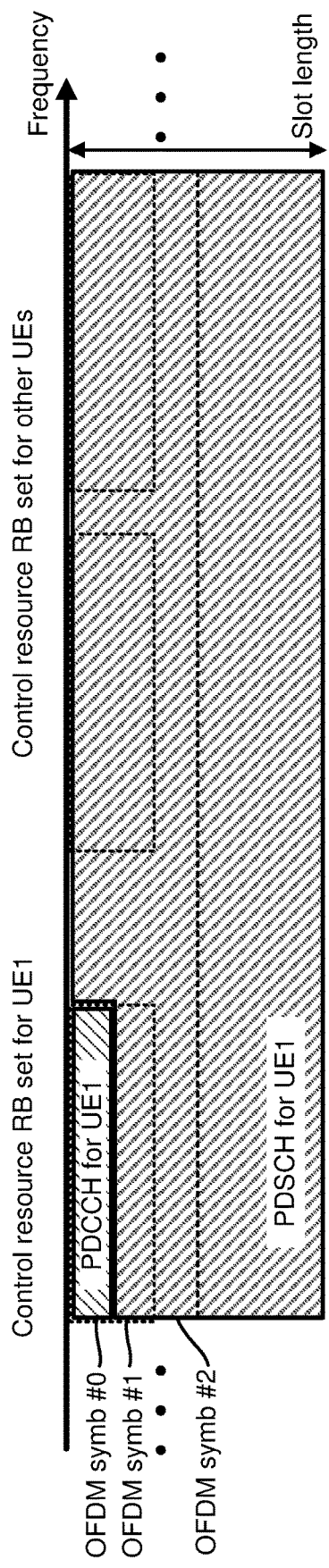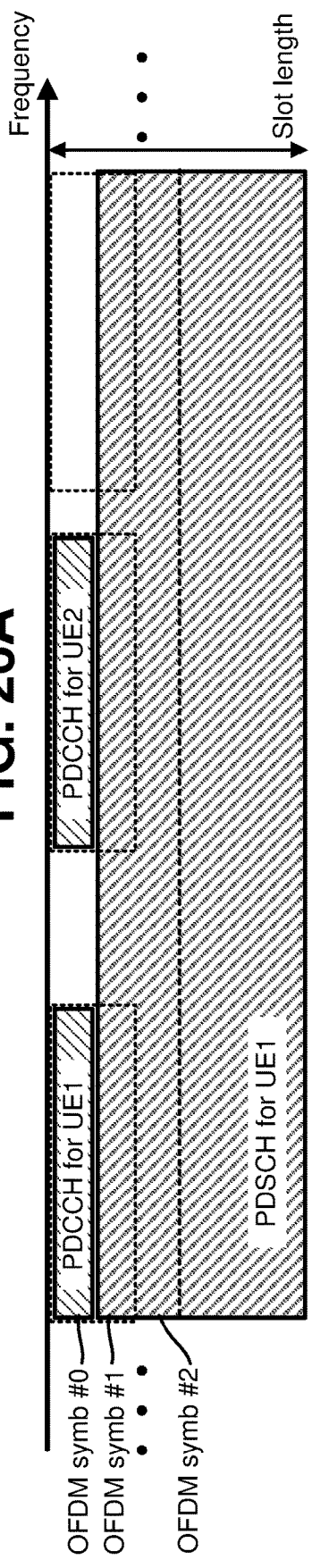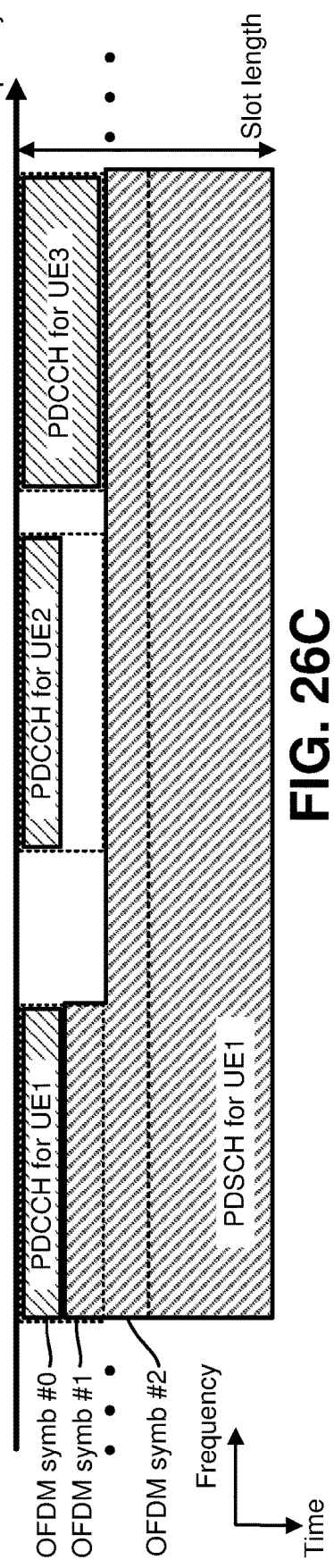

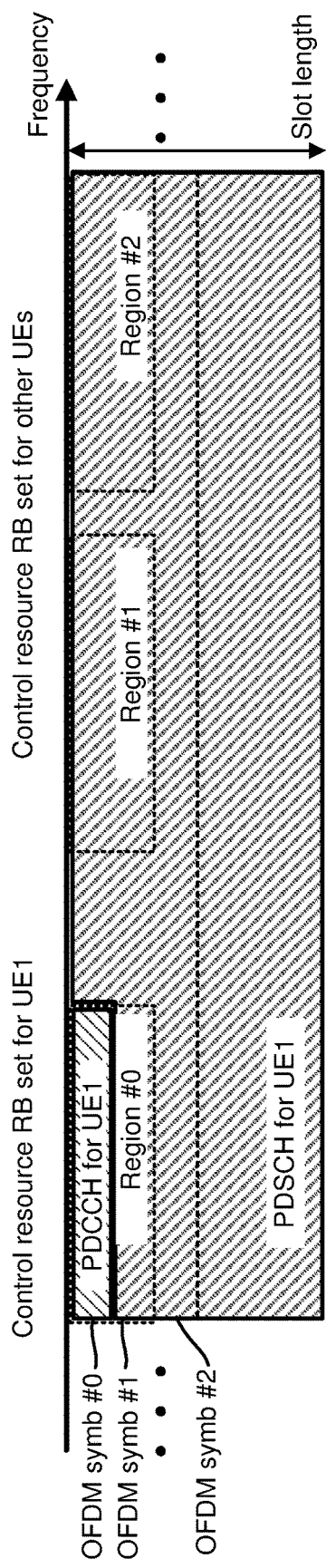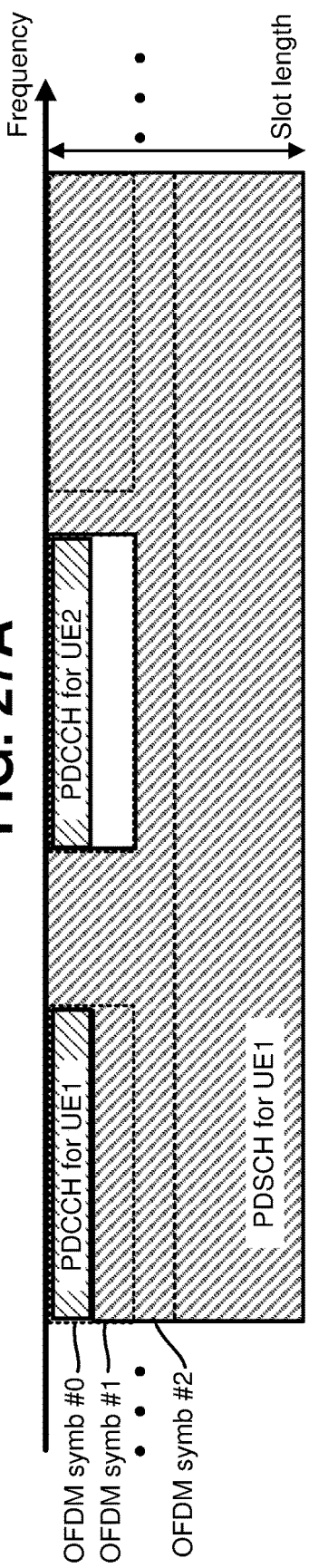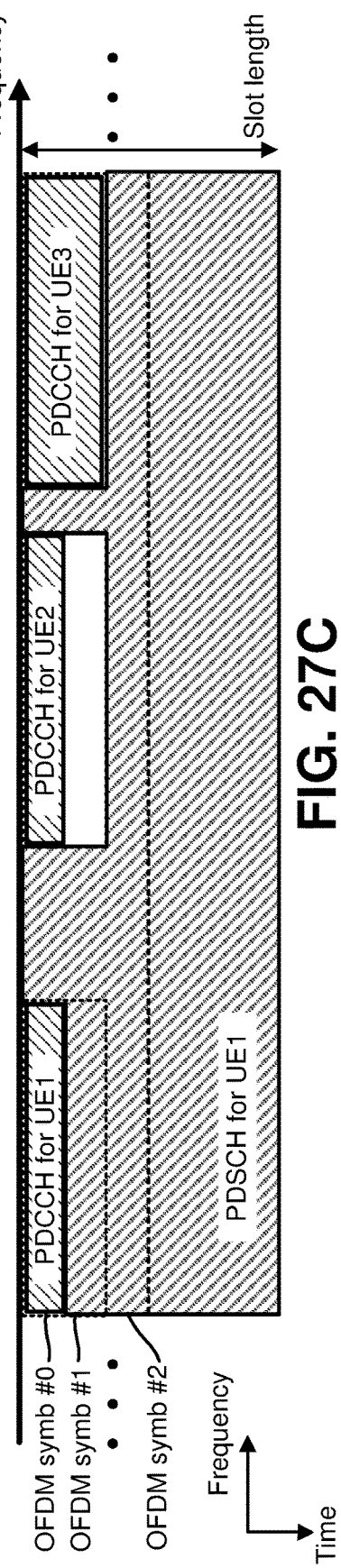
FIG. 27A
FIG. 27B
FIG. 27C

USER EQUIPMENTS, BASE STATIONS AND METHODS FOR RNTI-BASED PDSCH DOWNLINK SLOT AGGREGATION

CROSS-REFERENCE TO RELATED APPLICATION(S)

The present application is a continuation of PCT Application No. PCT/US18/49765, filed on Sep. 6, 2018, entitled "USER EQUIPMENTS, BASE STATIONS AND METHODS FOR RNTI-BASED PDSCH DOWNLINK SLOT AGGREGATION,", which claims the benefit of and priority to U.S. Provisional Patent Application No. 62/556,189 filed on Sep. 8, 2017, entitled "USER EQUIPMENTS, BASE STATIONS AND METHODS,". The entire contents of the SLA3762PCT and SLA3762P applications are hereby expressly incorporated fully by reference into the present application.

FIELD

The present disclosure relates generally to communication systems. More specifically, the present disclosure relates to new signaling, procedures, user equipment (UE) and base stations for communication systems.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY

The present disclosure is directed to new signaling, procedures, user equipment (UE) and base stations for communication systems.

In a first aspect of the present disclosure, a user equipment (UE) is disclosed, the UE comprising: a higher layer processor configured to acquire a dedicated radio resource control (RRC) configuration for a downlink slot aggregation; physical downlink control channel (PDCCH) receiving circuitry configured to monitor a PDCCH carrying a downlink control information (DCI) format for scheduling a physical downlink shared channel (PDSCH); and PDSCH receiving circuitry configured to receive the PDSCH; wherein: if the PDCCH is with a first radio network temporary identifier (RNTI), the downlink slot aggregation applies to the PDSCH; and if the PDCCH is with a second RNTI, the downlink slot aggregation does not apply to the PDSCH.

In a second aspect of the present disclosure, a method for a user equipment (UE) is disclosed, the method comprising: acquiring, through a higher layer processor, a dedicated radio resource control (RRC) configuration for a downlink slot aggregation; monitoring, through physical downlink control channel (PDCCH) receiving circuitry, a PDCCH carrying a downlink control information (DCI) format for scheduling a physical downlink shared channel (PDSCH); and receiving, through PDSCH receiving circuitry, the PDSCH; wherein: if the PDCCH is with a first radio network temporary identifier (RNTI), the downlink slot aggregation applies to the PDSCH; and if the PDCCH is with a second RNTI, the downlink slot aggregation does not apply to the PDSCH.

In a third aspect of the present disclosure, a base station is disclosed, the base station comprising: a higher layer processor configured to send a dedicated radio resource control (RRC) configuration for a downlink slot aggregation; physical downlink control channel (PDCCH) transmitting circuitry configured to transmit a PDCCH carrying a downlink control information (DCI) format for scheduling a physical downlink shared channel (PDSCH); and PDSCH transmitting circuitry configured to transmit the PDSCH; wherein: if the PDCCH is with a first radio network temporary identifier (RNTI), the downlink slot aggregation applies to the PDSCH; and if the PDCCH is with a second RNTI, the downlink slot aggregation does not apply to the PDSCH.

In a fourth aspect of the present disclosure, a method for a base station is disclosed, the method comprising: sending, through a higher layer processor, a dedicated radio resource control (RRC) configuration for a downlink slot aggregation; transmitting, through physical downlink control channel (PDCCH) transmitting circuitry, a PDCCH carrying a downlink control information (DCI) format for scheduling a physical downlink shared channel (PDSCH); and transmitting, through the PDSCH transmitting circuitry, the PDSCH; wherein: if the PDCCH is with a first radio network temporary identifier (RNTI), the downlink slot aggregation applies to the PDSCH; and if the PDCCH is with a second RNTI, the downlink slot aggregation does not apply to the PDSCH.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIGS. 7A, 7B, 7C, and 7D show examples of several numerologies;

FIGS. 8A, 8B, and 8C show examples of subframe structures for the numerologies that are shown in respective FIGS. 7A, 7B, and 7D;

FIGS. 9A, 9B, and 9C show examples of subframe structures for the numerologies that are shown in respective FIGS. 7A, 7B, and 7D;

FIGS. 10A, 10B, 10C, 10D, 10E and 10F show examples of slots and sub-slots;

FIG. 23 illustrates a table specifying values for explicit timing indications;

FIG. 24 illustrates another table specifying values for explicit timing indications;

FIGS. 26A, 26B, and 26C illustrate examples of resource sharing between control channel and shared channel;

FIGS. 27A, 27B, and 27C illustrate examples of resource sharing between control channel and shared channel;

DETAILED DESCRIPTION

Figure 1:
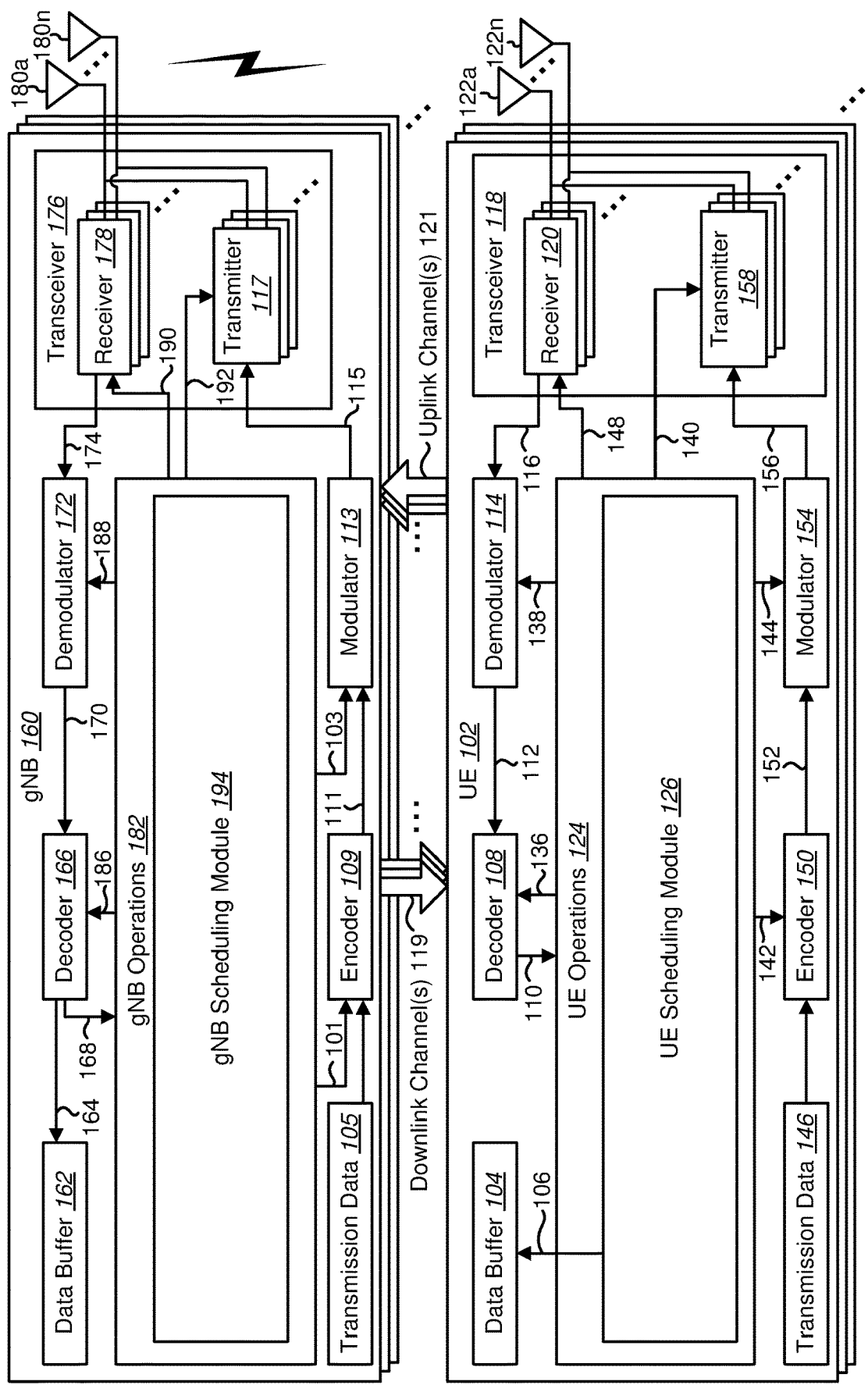
FIG. 1 is a block diagram illustrating one implementation of one or more gNBs and one or more user equipments (UEs) in which systems and methods for uplink transmission may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RS s transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and uplink transmissions may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform uplink transmissions. The uplink transmissions include data transmission transmission) and/or uplink reference signal transmission.

In a radio communication system, physical channels (uplink physical channels and/or downlink physical channels) may be defined. The physical channels (uplink physical channels and/or downlink physical channels) may be used for transmitting information that is delivered from a higher layer. For example, PCCH (Physical Control Channel) may be defined. PCCH is used to transmit control information.

In uplink, PCCH (e.g., Physical Uplink Control Channel (PUCCH)) is used for transmitting Uplink Control Information (UCI). The UCI may include Hybrid Automatic Repeat Request (HARQ-ACK), Channel State information (CSI), and/or Scheduling Request (SR). The HARQ-ACK is used for indicating a positive acknowledgement (ACK) or a negative acknowledgment (NACK) for downlink data (e.g., Transport block(s), Medium Access Control Protocol Data Unit (MAC PDU), and/or Downlink Shared Channel (DL-SCH)). The CSI is used for indicating state of downlink channel. Also, the SR is used for requesting resources of uplink data (e.g., Transport block(s), MAC PDU, and/or Uplink Shared Channel (UL-SCH)).

In downlink, PCCH (e.g., Physical Downlink Control Channel (PDCCH)) may be used for transmitting Downlink Control Information (DCI). Here, more than one DCI formats may be defined for DCI transmission on the PDCCH. Namely, fields may be defined in the DCI format, and the fields are mapped to the information bits (e.g., DCI bits). For example, a DCI format 1A that is used for scheduling of one physical shared channel (PSCH) (e.g., PDSCH, transmission of one downlink transport block) in a cell is defined as the DCI format for the downlink. The DCI format(s) for PDSCH scheduling may include multiple information field, for example, carrier indicator field, frequency domain PDSCH resource allocation field, time domain PDSCH resource allocation field, bundling size field, MCS field, new data indicator field, redundancy version field, HARQ process number field, code block group flush indicator (CBGFI) field, code block group transmission indicator (CBGTI) field, PUCCH power control field, PUCCH resource indicator field, antenna port field, number of layer field, quasi-co-location (QCL) indication field, SRS triggering request field, and RNTI field. More than one pieces of the above information may be jointly coded, and in this instance jointly coded information may be indicated in a single information field.

Also, for example, a DCI format 0 that is used for scheduling of one PSCH (e.g., PUSCH, transmission of one uplink transport block) in a cell is defined as the DCI format for the uplink. For example, information associated with PSCH (a PDSCH resource, PUSCH resource) allocation, information associated with modulation and coding scheme (MCS) for PSCH, and DCI such as Transmission Power Control (TPC) command for PUSCH and/or PUCCH are included the DCI format. Also, the DCI format may include information associated with a beam index and/or an antenna port. The beam index may indicate a beam used for downlink transmissions and uplink transmissions. The antenna port may include DL antenna port and/or UL antenna port. The DCI format(s) for PUSCH scheduling may include multiple information field, for example, carrier indicator field, frequency domain PUSCH resource allocation field, time domain PUSCH resource allocation field, MCS field, new data indicator field, redundancy version field, HARQ process number field, code block group flush indicator (CBGFI) field, code block group transmission indicator (CBGTI) field, PUSCH power control field, SRS resource indicator (SRI) field, wideband and/or sub-band transmit precoding matrix indicator (TPMI) field, antenna port field, scrambling identity field, number of layer field, CSI report triggering request field, CSI measurement request field, SRS triggering request field, and RNTI field. More than one pieces of the above information may be jointly coded, and in this instance jointly coded information may be indicated in a single information field.

Also, for example, PSCH may be defined. For example, in a case that the downlink PSCH resource (e.g., PDSCH resource) is scheduled by using the DCI format, the UE 102 may receive the downlink data, on the scheduled downlink PSCH resource. Also, in a case that the uplink PSCH resource (e.g., PUSCH resource) is scheduled by using the DCI format, the UE 102 transmits the uplink data, on the scheduled uplink PSCH resource. Namely, the downlink PSCH is used to transmit the downlink data. And, the uplink PSCH is used to transmit the uplink data.

Furthermore, the downlink PSCH and the uplink PSCH are used to transmit information of higher layer (e.g., Radio Resource Control (RRC)) layer, and/or MAC layer). For example, the downlink PSCH and the uplink PSCH are used to transmit RRC message (RRC signal) and/or MAC Control Element (MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

Furthermore, in the radio communication for uplink, UL RS(s) is used as uplink physical signal(s). The uplink physical signal is not used to transmit information that is provided from the higher layer, but is used by a physical layer. For example, the UL RS(s) may include the demodulation reference signal(s), the UE-specific reference signal(s), the sounding reference signal(s), and/or the beam-specific reference signal(s). The demodulation reference signal(s) may include demodulation reference signal(s) associated with transmission of uplink physical channel (e.g., PUSCH and/or PUCCH).

Also, the UE-specific reference signal(s) may include reference signal(s) associated with transmission of uplink physical channel (e.g., PUSCH and/or PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the transmission data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180*a*-*n*. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180*a*-*n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the transmission data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the gNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
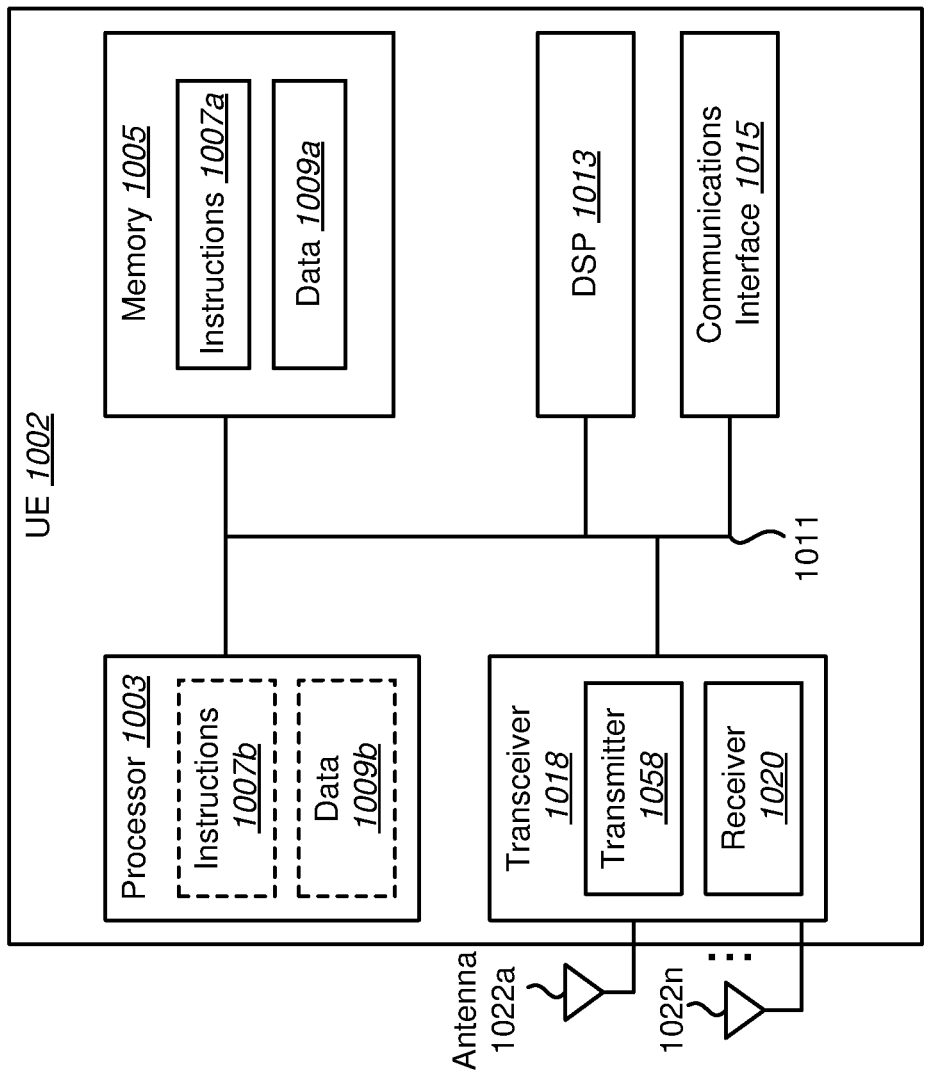
FIG. 2 illustrates various components that may be utilized in a UE.

FIG. 2 illustrates various components that may be utilized in a UE 1002. The UE 1002 described in connection with FIG. 2 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 2 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 2 is a functional block diagram rather than a listing of specific components.

Figure 3:
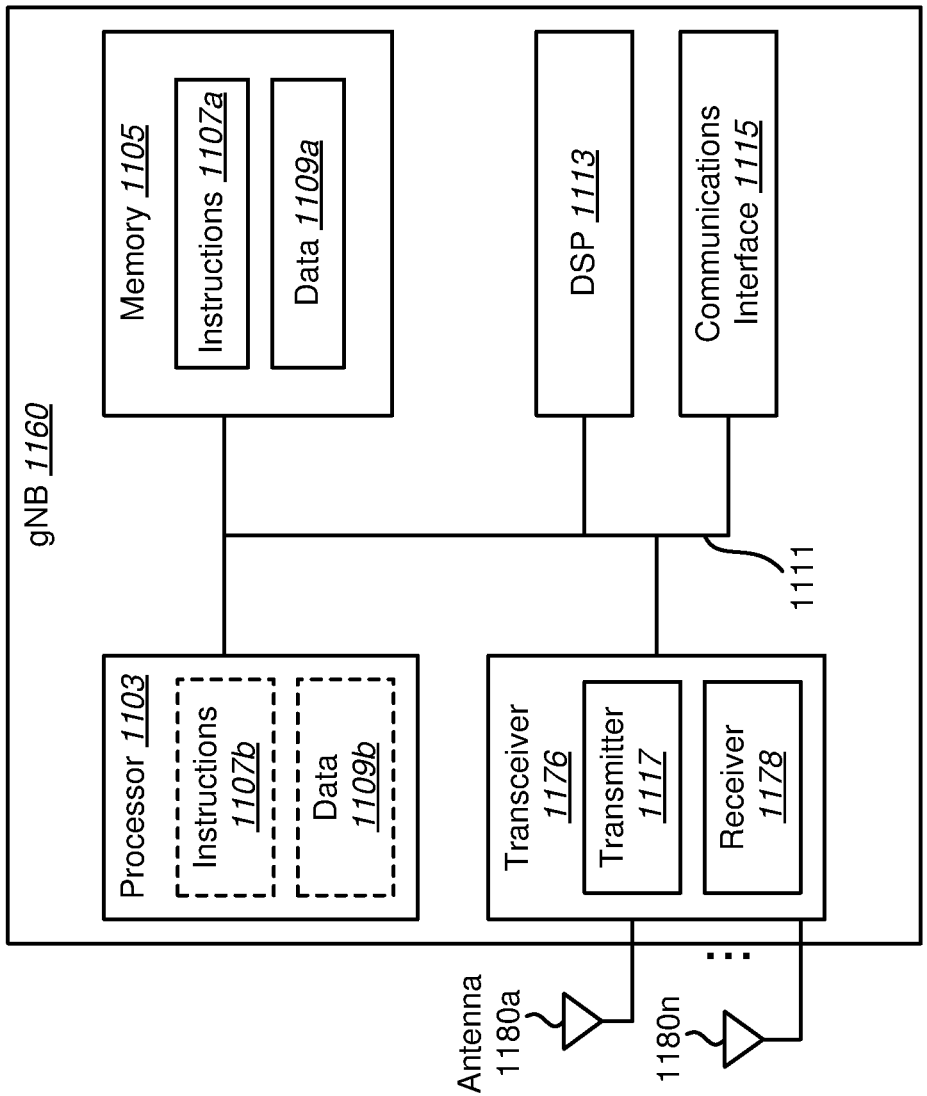
FIG. 3 illustrates various components that may be utilized in a gNB.

FIG. 3 illustrates various components that may be utilized in a gNB 1160. The gNB 1160 described in connection with FIG. 3 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107a and data 1109a to the processor 1103. A portion of the memory 1105 may also include non-volatile random access memory (NVRAM). Instructions 1107b and data 1109b may also reside in the processor 1103. Instructions 1107b and/or data 1109b loaded into the processor 1103 may also include instructions 1107a and/or data 1109a from memory 1105 that were loaded for execution or processing by the processor 1103. The instructions 1107b may be executed by the processor 1103 to implement the methods described above.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 3 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 3 is a functional block diagram rather than a listing of specific components.

Figure 4:
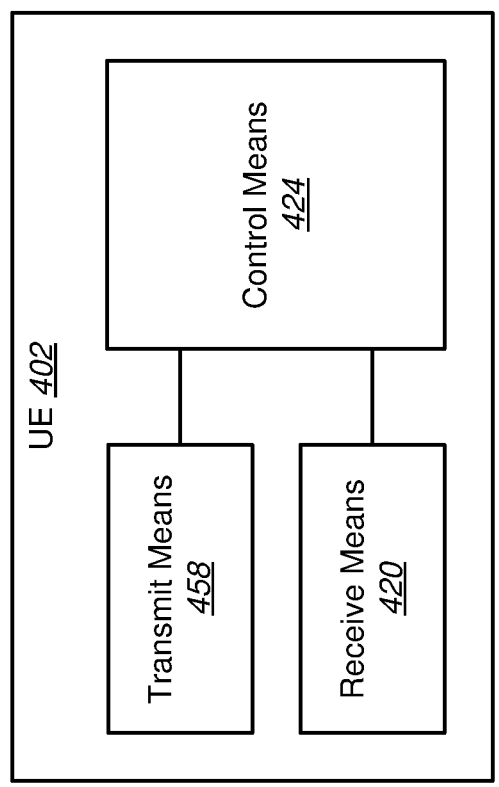
FIG. 4 is a block diagram illustrating one implementation of a UE in which systems and methods for performing uplink transmissions may be implemented.

FIG. 4 is a block diagram illustrating one implementation of a UE 402 in which systems and methods for performing uplink transmissions may be implemented. The UE 402 includes transmit means 458, receive means 420 and control means 424. The transmit means 458, receive means 420 and control means 424 may be configured to perform one or more of the functions described in connection with FIG. 1 above. FIG. 2 above illustrates one example of a concrete apparatus structure of FIG. 4. Other various structures may be implemented to realize one or more of the functions of FIG. 1. For example, a DSP may be realized by software.

Figure 5:
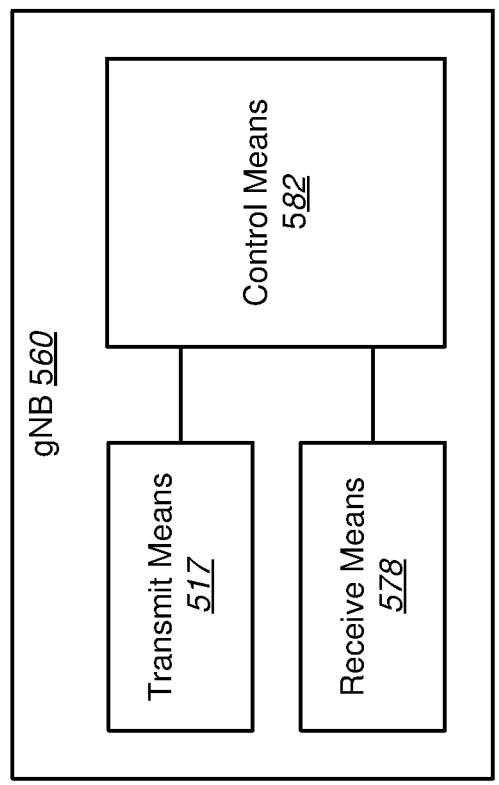
FIG. 5 is a block diagram illustrating one implementation of a gNB in which systems and methods for performing uplink transmissions may be implemented.

FIG. 5 is a block diagram illustrating one implementation of a gNB 1360 in which systems and methods for performing uplink transmissions may be implemented. The gNB 560 includes transmit means 517, receive means 578 and control means 582. The transmit means 517, receive means 578 and control means 582 may be configured to perform one or more of the functions described in connection with FIG. 1 above. FIG. 3 above illustrates one example of a concrete apparatus structure of FIG. 5. Other various structures may be implemented to realize one or more of the functions of FIG. 1. For example, a DSP may be realized by software.

Figure 6:
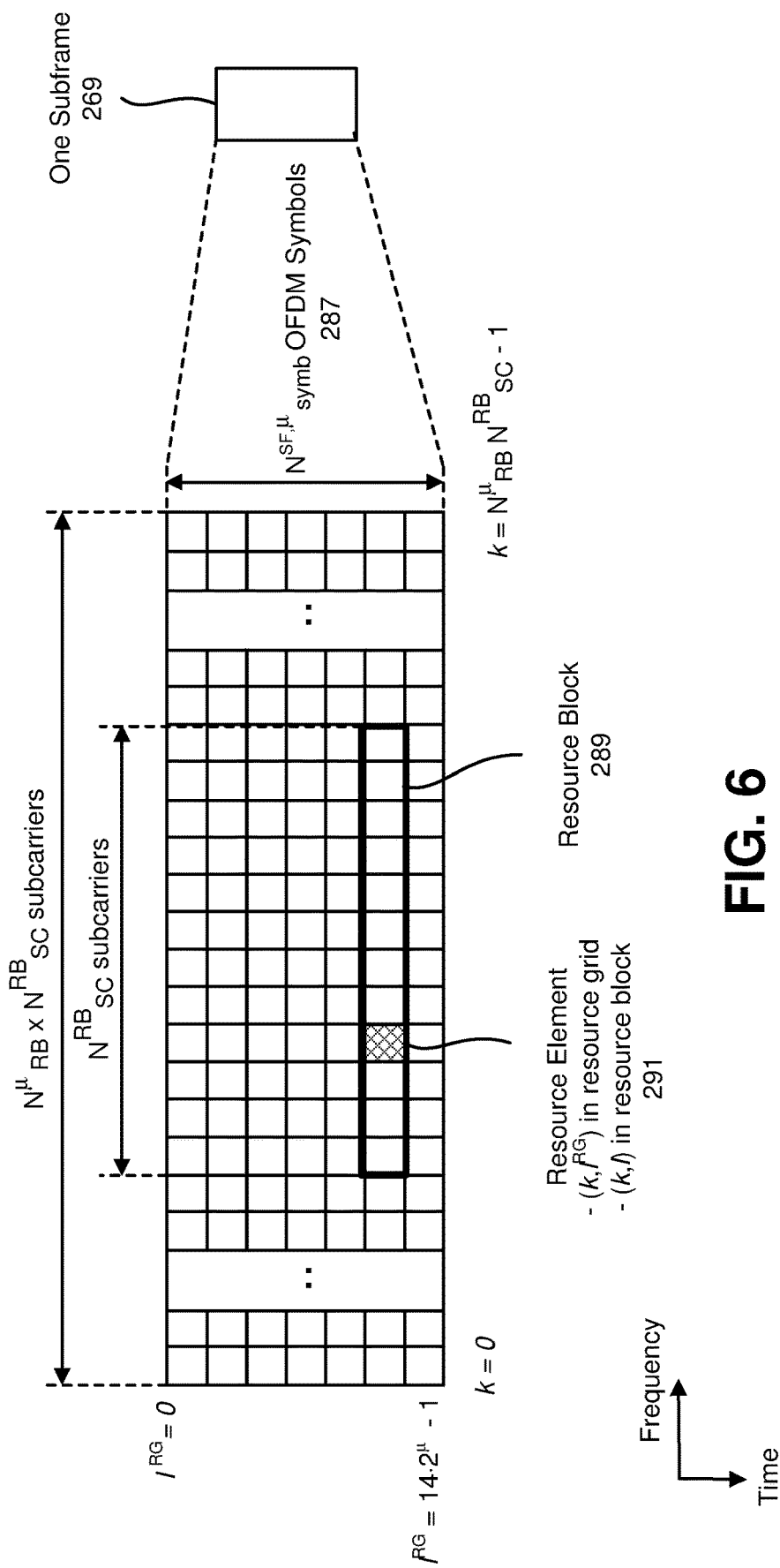
FIG. 6 is a diagram illustrating one example of a resource.
Figures 11A, 11B, 11C, 11D:
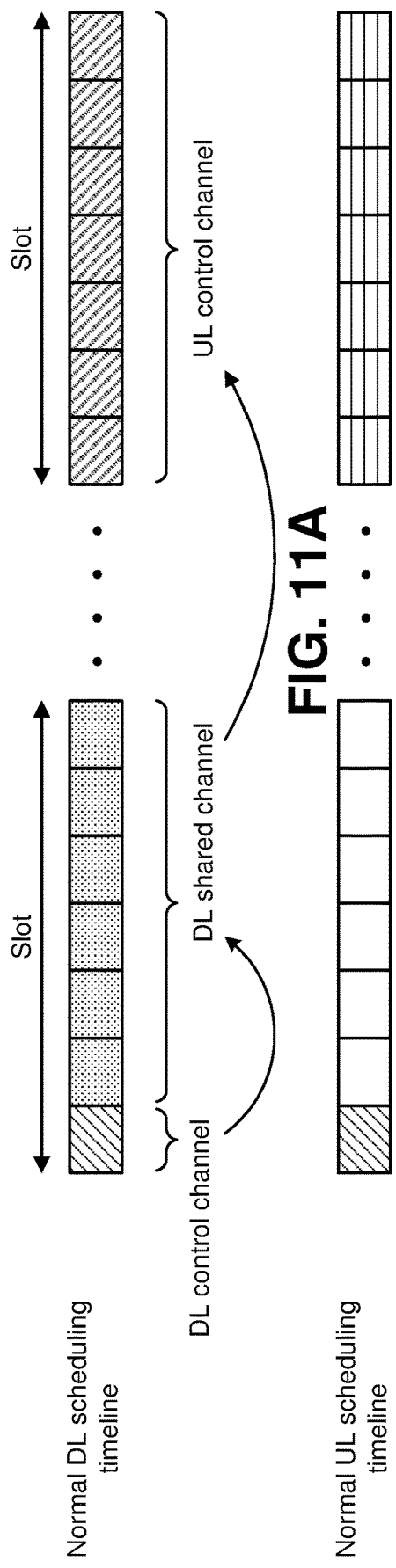
FIGS. 11A, 11B, 11C, and 11D show examples of scheduling timelines.

FIG. 6 is a diagram illustrating one example of a resource grid. The resource grid illustrated in FIG. 6 may be applicable for both downlink and uplink and may be utilized in some implementations of the systems and methods disclosed herein. More detail regarding the resource grid is given in connection with FIG. 1.

In FIG. 6, one subframe 269 may include one or several slots. For a given numerology $\mu$, $N^{\mu}_{RB}$ is bandwidth configuration of the serving cell, expressed in multiples of $N^{RB}_{sc}$, where $N^{RB}_{sc}$ is a resource block 289 size in the frequency domain expressed as a number of subcarriers, and $N^{SF,\mu}_{symb}$ is the number of Orthogonal Frequency Division Multiplexing (OFDM) symbols 287 in a subframe 269. In other words, for each numerology $\mu$ and for each of downlink and uplink, a resource grid of $N^{\mu}_{RB}*N^{RB}_{sc}$ subcarriers and $N^{SF,\mu}_{symb}$ OFDM symbols may be defined. There may be one resource grid per antenna port p, per subcarrier spacing configuration (e.g., numerology) μ, and per transmission direction (uplink or downlink). A resource block 289 may include a number of resource elements (RE) 291.

Multiple OFDM numerologies (also referred to as just numerologies) are supported as given by Table X1. Each of the numerologies may be tied to its own subcarrier spacing Δf.

TABLE X1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

For subcarrier spacing configuration μ, slots are numbered $n^\mu_s \in \{0, \ldots, N^{SF,\mu}_{slot}-1\}$ in increasing order within a subframe and $n^\mu_{s,f} \in \{0, \ldots, N^{frame,\mu}_{slot}-1\}$ in increasing order within a frame. There are $N^{slot,\mu}_{symb}$ consecutive OFDM symbols in a slot where $N^{slot,\mu}_{symb}$ depends on the subcarrier spacing used and the slot configuration as given by Table X2 for normal cyclic prefix and Table X3 for extended cyclic prefix. The number of consecutive OFDM symbols per subframe is $N^{SF,\mu}_{symb} = N^{slot,\mu}_{symb} \cdot N^{SF,\mu}_{slot}$. The start of slot $n^\mu_s$ in a subframe is aligned in time with the start of OFDM symbol $n^\mu_s N^{slot,\mu}_{symb}$ in the same subframe. Not all UEs may be capable of simultaneous transmission and reception, implying that not all OFDM symbols in a downlink slot or an uplink slot may be used.

TABLE X2

| | Slot configuration | | | | | |
|---|---|---|---|---|---|---|
| | 0 | | | 1 | | |
| μ | $N^{slot,\mu}_{symb}$ | $N^{frame,\mu}_{slot}$ | $N^{SF,\mu}_{slot}$ | $N^{slot,\mu}_{symb}$ | $N^{frame,\mu}_{slot}$ | $N^{SF,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE X3

| | Slot configuration | | | | | |
|---|---|---|---|---|---|---|
| | 0 | | | 1 | | |
| μ | $N^{slot,\mu}_{symb}$ | $N^{frame,\mu}_{slot}$ | $N^{SF,\mu}_{slot}$ | $N^{slot,\mu}_{symb}$ | $N^{frame,\mu}_{slot}$ | $N^{SF,\mu}_{slot}$ |
| 2 | 12 | 40 | 4 | 6 | 80 | 8 |

For a PCell, $N^\mu_{RB}$ is broadcast as a part of system information. For an SCell (including a Licensed-Assisted Access (LAA) SCell), $N^\mu_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

The OFDM access scheme with cyclic prefix (CP) may be employed, which may be also referred to as CP-OFDM. In the downlink, PDCCH, EPDCCH (Enhanced Physical Downlink Control Channel), PDSCH and the like may be transmitted. A radio frame may include a set of subframes 269 (e.g., 10 subframes). The RB is a unit for assigning downlink radio resources, defined by a predetermined bandwidth (RB bandwidth) and one or more OFDM symbols.

A physical resource block is defined as $N^{RB}_{sc}=12$ consecutive subcarriers in the frequency domain. Physical resource blocks are numbered from 0 to $N^\mu_{RB}-1$ in the frequency domain. The relation between the physical resource block number $n_{PRB}$ in the frequency domain and resource elements (k,l) is given by $np_{RB} = \mathrm{floor}(k/N^{RB}_{sc})$. The RB includes twelve sub-carriers in frequency domain and one or more OFDM symbols in time domain. A region defined by one sub-carrier in frequency domain and one OFDM symbol in time domain is referred to as a resource element (RE) and is uniquely identified by the index pair $(k,l^{RG})$ in the resource grid, where $k=0, \ldots, N^\mu_{RB} N^{RB}_{sc}-1$ and $l^{RG}=0, \ldots, N^{SF,\mu}_{symb}-1$ are indices in the frequency and time domains, respectively. Moreover, RE is uniquely identified by the index pair (k,l) in a RB, where l are indices in the time domain. When referring to a resource element in a slot the index pair (k,l) is used where $l=0, \ldots, N^{slot,\mu}_{symb}-1$. While subframes in one component carrier (CC) are discussed herein, subframes are defined for each CC and subframes are substantially in synchronization with each other among CCs.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, Physical Random Access Channel (PRACH) and the like may be transmitted.

A UE 102 may be instructed to receive or transmit using a subset of the resource grid only. The set of resource blocks a UE is referred to as a carrier bandwidth part and may be configured to receive or transmit upon are numbered from 0 to $N^\mu_{RB}-1$ in the frequency domain. The UE may be configured with one or more carrier bandwidth parts, each of which may have the same or different numerology.

One or more sets of PRB(s) may be configured for DL control channel monitoring. In other words, a control resource set is, in the frequency domain, a set of PRBs within which the UE 102 attempts to blindly decode downlink control information (e.g., monitor downlink control information (DCI)), where the PRBs may or may not be frequency contiguous, a UE 102 may have one or more control resource sets, and one DCI message may be located within one control resource set. In the frequency-domain, a PRB is the resource unit size (which may or may not include DMRS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Namely, the UE 102 may monitor a set of PDCCH candidates. Here, the PDCCH candidates may be candidates for which the PDCCH may possibly be assigned and/or transmitted. A PDCCH candidate is composed of one or more control channel elements (CCEs). The term "monitor" means that the UE 102 attempts to decode each PDCCH in the set of PDCCH candidates in accordance with all the DCI formats to be monitored.

The set of PDCCH candidates that the UE 102 monitors may be also referred to as a search space. That is, the search space is a set of resource that may possibly be used for PDCCH transmission.

Furthermore, a common search space (CSS) and a user-equipment search space (USS) are set (or defined, configured) in the PDCCH resource region. For example, the CSS may be used for transmission of DCI to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15.

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102. There may be one or more types of CSS. For example, Type 0 PDCCH CSS may be defined for a DCI format scrambled by a System Information-Radio Network Temporary Identifier (SI-RNTI) on PCell. Type 1 PDCCH CSS may be defined for a DCI format scrambled by an Interval-(INT-)RNTI, where if a UE 102 is configured by higher layers to decode a DCI format with CRC scrambled by the INT-RNTI and if the UE 102 detects the DCI format with CRC scrambled by the INT-RNTI, the UE 102 may assume that no transmission to the UE 102 is present in OFDM symbols and resource blocks indicated by the DCI format. Type 2 PDCCH CSS may be defined for a DCI format scrambled by a Random Access-(RA-)RNTI. Type 3 PDCCH CSS may be defined for a DCI format scrambled by a Paging-(P-)RNTI. Type 4 PDCCH CSS may be defined for a DCI format scrambled by the other RNTI (e.g., Transmit Power Control-(TPC-)RNTI, Pre-emption Indication-(PI-) RNTI, Slot Format-(SF-) RNTI).

The USS may be used for transmission of DCI to a specific UE 102. That is, the USS is defined by a resource dedicated to a certain UE 102. That is, the USS may be defined independently for each UE 102. For example, the USS may be composed of CCEs having numbers that are determined based on an RNTI assigned by the gNB 160, a slot number in a radio frame, an aggregation level, or the like.

Here, the RNTI(s) may include C-RNTI (Cell-RNTI), Temporary C-RNTI. Also, the USS (the position(s) of the USS) may be configured by the gNB 160. For example, the gNB 160 may configure the USS by using the RRC message. That is, the base station may transmit, in the USS, DCI format(s) intended for a specific UE 102.

Here, the RNTI assigned to the UE 102 may be used for transmission of DCI (transmission of PDCCH). Specifically, CRC (Cyclic Redundancy Check) parity bits (also referred to simply as CRC), which are generated based on DCI (or DCI format), are attached to DCI, and, after attachment, the CRC parity bits are scrambled by the RNTI. The UE 102 may attempt to decode DCI to which the CRC parity bits scrambled by the RNTI are attached, and detects PDCCH (e.g., DCI, DCI format). That is, the UE 102 may decode PDCCH with the CRC scrambled by the RNTI.

When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

FIGS. 7A, 7B, 7C, and 7D show examples of several numerologies. The numerology #1 ($\mu=0$) may be a basic numerology. For example, a RE of the basic numerology is defined with subcarrier spacing of 15 kHz in frequency domain and 2048κTs+CP length (e.g., 512κTs, 160κTs or 144κTs) in time domain, where Ts denotes a baseband sampling time unit defined as 1/(15000*2048) seconds. For the $\mu$-th numerology, the subcarrier spacing may be equal to $15*2^\mu$ and the effective OFDM symbol length NuTs=$2048*2^{-\mu}$κTs. It may cause the symbol length is $2048*2^{-\mu}$κTs+CP length (e.g., $512*2^{-\mu}$κTs, $160*2^{-\mu}$κTs or $144*2^{-\mu}$κTs). Note that K=64, Ts=$1/(\Delta f_{max} \cdot N_f)$, $\Delta f_{max}=480 \cdot 10^3$ Hz (e.g., $\Delta f$ for $\mu=5$), and $N_f=4096$. In other words, the subcarrier spacing of the $\mu+1$-th numerology is a double of the one for the $\mu$-th numerology, and the symbol length of the $\mu+1$-th numerology is a half of the one for the $\mu$-th numerology. FIGS. 7A, 7B, 7C, and 7D show four numerologies, but the system may support another number of numerologies.

FIGS. 8A, 8B, and 8C show a set of examples of subframe structures for the numerologies that are shown in respective FIGS. 7A, 7B, and 7D. These examples are based on the slot configuration set to 0. A slot includes 14 symbols, the slot length of the $\mu+1$-th numerology is a half of the one for the $\mu$-th numerology, and eventually the number of slots in a subframe (e.g., 1 ms) becomes double. It may be noted that a radio frame may include 10 subframes, and the radio frame length may be equal to 10 ms.

FIGS. 9A, 9B, and 9C show another set of examples of subframe structures for the numerologies that are shown in respective FIGS. 7A, 7B, and 7D. These examples are based on the slot configuration set to 1. A slot includes 7 symbols, the slot length of the $\mu+1$-th numerology is a half of the one for the $\mu$-th numerology, and eventually the number of slots in a subframe (e.g., 1 ms) becomes double.

FIGS. 10A, 10B, 10C, 10D, 10E, and 10F show examples of slots and sub-slots. If sub-slot (e.g., time domain resource allocation in unites of OFDM symbol or a set of a few OFDM symbols) is not configured by higher layer, the UE 102 and the gNB 160 may only use a slot as a scheduling unit. More specifically, a given transport block may be allocated to a slot. If the sub-slot is configured by higher layer, the UE 102 and the gNB 160 may use the sub-slot as well as the slot. The sub-slot may include one or more OFDM symbols. The maximum number of OFDM symbols that constitute the sub-slot may be $N^{SF,\mu}_{symb}-1$. The sub-slot length may be configured by higher layer signaling. Alternatively, the sub-slot length may be indicated by a physical layer control channel (e.g., by DCI format). The sub-slot may start at any symbol within a slot unless it collides with a control channel. There could be restrictions of mini-slot length based on restrictions on starting position. For example, the sub-slot with the length of $N^{SF,\mu}_{symb}-1$ may start at the second symbol in a slot. The starting position of a sub-slot may be indicated by a physical layer control channel (e.g., by DCI format). Alternatively, the starting position of a sub-slot may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot. In cases when the sub-slot is configured, a given transport block may be allocated to either a slot, a sub-slot, aggregated sub-slots or aggregated sub-slot(s) and slot. This unit may also be a unit for HARQ-ACK bit generation.

FIGS. 11A, 11B, 11C, and 11D show examples of scheduling timelines. For a normal DL scheduling timeline, DL control channels are mapped the initial part of a slot. The DL control channels schedule DL shared channels in the same slot. HARQ-ACKs for the DL shared channels (e.g., HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline, DL control channels are mapped the initial part of a slot. The DL control channels schedules DL shared channels in the same slot. HARQ-ACKs for the DL shared channels are reported UL control channels which are mapped at the ending part of the slot. For a self-contained base UL scheduling timeline, DL control channels are mapped the initial part of a slot. The DL control channels schedules UL shared channels in the same slot. For these cases, the slot may contain DL and UL portions, and there may be a guard period between the DL and UL transmissions. The use of self-contained slot may be upon a configuration of self-contained slot. Alternatively, the use of self-contained slot may be upon a configuration of the sub-slot. Yet alternatively, the use of self-contained slot may be upon a configuration of shortened physical channel (e.g., PDSCH, PUSCH, PUCCH, etc.).

Slot format indicator (SFI) may be defined to specify a format for one or more slot(s). With SFI, the UE 102 may be able to derive at least which symbols in a given slot that are 'DL', 'UL', 'unknown' and 'reserved', respectively. With SFI, the UE 102 may also be able to derive the number of slots for which the SFI indicates their formats. SFI may be configured by dedicated RRC configuration message. Alternatively and/or additionally, SFI may be signaled by a group-common PDCCH (e.g., PDCCH with SF-RNTI). Yet alternatively and/or additionally, SFI may be broadcasted via master information block (MIB) or remaining minimum system information (RMSI).

For example, 3 bit SFI can express up to 8 combinations of 'DL', 'UL', 'Unknown' and 'reserved', each combination consists of $Ns^{slot,\mu}_{symb}$ pieces of symbol types. More specifically, given that $N^{slot,\mu}_{symb}=14$, one combination may be 'Unknown' 'Unknown' 'Unknown' 'Unknown' 'Unknown' 'Unknown' 'Unknown' 'Unknown' 'Unknown' 'Unknown' 'Unknown' 'Unknown' 'Unknown' 'Unknown' Another combination may be all 'DL, that is 'DL' 'DL' 'DL' 'DL' 'DL' 'DL' 'DL' 'DL' 'DL' 'DL' 'DL' 'DL' 'DL' 'DL' Yet another combination may be all 'UL, that is 'UL' 'UL' 'UL' 'UL' Yet another combination may be a combination of 'DL', 'UL' and 'Reserved' such as 'DL' 'DL' 'DL' 'DL' 'DL' 'DL' 'DL' 'Reserved' 'Reserved' 'Reserved' 'Reserved' 'UL'.

'DL' symbols may be available for DL receptions and CSI/RRM measurements at the UE 102 side. 'UL' symbols may be available for UL transmissions at the UE 102 side. 'Unknown' resource may be 'flexible' and can be overridden by at least by DCI indication. 'Unknown' may be used to achieve the same as 'Reserved' if not overridden by DCI and/or SFI indication. 'Reserved' resource may be 'not transmit' and 'not receive' but cannot be overridden by DCI/SFI indication. On 'Unknown' symbols, UE 102 may not be allowed to assume any DL and UL transmissions which are configured by higher-layer but not indicated by DCI/SFI indications, for example, periodic CSI-RS, periodic CSI-IM, semi-persistently scheduled CSI-RS, periodic CSI reporting, semi-persistently scheduled CSI reporting, periodic SRS transmission, higher-layer configured PSS/SSS/PBCH.

The overriding of 'Unknown' symbols by the DCI means that UE 102 may have to assume only DL and UL transmissions (PDSCH transmission, PUSCH transmission, aperiodic CSI-RS transmission, aperiodic CSI-IM resource, aperiodic SRS transmission) which are indicated by DCI indications. The overriding of 'Unknown' symbols by the SFI means that UE 102 may have to assume the symbols as either 'DL', 'UL', or 'Reserved' according to SFI indications. If the UE 102 assumes aperiodic CSI-RS transmission and/or aperiodic CSI-IM resource, the UE 102 may perform CSI and/or RRM measurement based on the aperiodic CSI-RS transmission and/or aperiodic CSI-IM resource. If the UE 102 does not assume aperiodic CSI-RS transmission and/or aperiodic CSI-IM resource, the UE 102 may not use the aperiodic CSI-RS transmission and/or aperiodic CSI-IM resource for CSI and/or RRM measurement.

If the serving cell is TDD cell and is DL only cell (a serving cell with downlink component carrier but without uplink component carrier), UE 102 may interpret 'UL' indicated by SFI as 'Unknown'. Alternatively, if the serving cell is TDD cell and is DL only cell, UE 102 may interpret 'UL' indicated by SFI as 'Reserved. If the serving cell is TDD cell and is UL only cell (a serving cell without downlink component carrier but with uplink component carrier), UE 102 may interpret 'DL' indicated by SFI as 'Unknown'. Alternatively, if the serving cell is TDD cell and is UL only cell, UE 102 may interpret 'DL' indicated by SFI as 'Reserved.

If the UE 102 detects PDCCH which indicate time domain resource allocation for the scheduled PDSCH includes 'Unknown' symbol(s), the UE 102 may assume the PDSCH is mapped on the 'Unknown' symbol(s). In this case, there are several options to handle the other DL transmission (e.g., aperiodic CSI-RS transmission, aperiodic CSI-IM resource) on the 'Unknown' symbol(s). The first option is that the UE 102 does not assume any other DL transmissions on the 'Unknown' symbol(s) except for the scheduled PDSCH. The second option is that the UE 102 assumes the other DL transmissions on the 'Unknown' symbol(s) within the resources which are allocated for the scheduled PDSCH. The UE 102 does not assume any other DL transmissions on the 'Unknown' symbol(s) outside the resources which are allocated for the scheduled PDSCH. The third option is that the UE 102 assumes the other DL transmissions on the 'Unknown' symbol(s) irrespective of resource allocation for the PDSCH. In other words, the 'Unknown' symbol(s) is interpreted as 'DL'.

The UE 102 may have to monitor PDCCH on 'Unknown' symbols. There may be several options to monitor PDCCH. If all of the OFDM symbols which are assigned for a given CORESET are 'DL', the UE 102 may assume all of the OFDM symbols are valid for monitoring of a PDCCH associated with the given CORESET. In this case, the UE 102 may assume each PDCCH candidate in the CORESET is mapped to all of the OFDM symbols for time-first REG-to-CCE mapping. If all of the OFDM symbols which are assigned for a given CORESET are 'Unknown', the UE 102 may assume all of the OFDM symbols are valid for monitoring of a PDCCH associated with the given CORESET. In this case, the UE 102 may assume each PDCCH candidate in the CORESET is mapped to all of the OFDM symbols for time-first REG-to-CCE mapping.

If every OFDM symbols which is assigned for a given CORESET is either 'UL' or 'Reserved', the UE 102 may assume those OFDM symbols are not valid for monitoring of a PDCCH associated with the given CORESET. If some of the OFDM symbols which are assigned for a given CORESET are 'DL' and the others are 'UL' or 'Reserved' or if some of the OFDM symbols which are assigned for a given CORESET are 'Unknown' and the others are 'UL' or 'Reserved', the UE 102 may assume only the 'DL' or 'Unknown' OFDM symbols are valid for monitoring of a PDCCH associated with the given CORESET. In this case, the UE 102 may assume each PDCCH candidate in the CORESET duration is mapped to all of the 'DL' OFDM symbols but not to 'UL' or 'Reserved' symbols. In other words, the UE 102 may assume a shortened CORESET duration than the CORESET duration which is configured by higher layer.

If some of the OFDM symbols which are assigned for a given CORESET are 'DL' and the others are 'Unknown', the UE 102 may assume all of the 'DL'/'Unknown' OFDM symbols are valid for monitoring of a PDCCH associated with the given CORESET. In this case, the UE 102 may assume each PDCCH candidate in the CORESET duration is mapped to all of the 'DL'/'Unknown' OFDM symbols, and a single PDCCH candidate may be allowed to be mapped across 'DL' and 'Unknown' OFDM symbols. Alternatively, if some of the OFDM symbols which are assigned for a given CORESET are 'DL' and the others are 'Unknown', the UE 102 may assume only the 'DL' OFDM symbols are valid for monitoring of a PDCCH associated with the given CORESET. In this case, the UE 102 may assume each PDCCH candidate in the CORESET duration is mapped to only the 'DL' OFDM symbols but not to 'Unknown' symbols. In other words, the UE 102 may not assume that a single PDCCH candidate is mapped across 'DL' and 'Unknown' OFDM symbols. Yet alternatively, which assumption the UE 102 follows may be set per CORESET. Alternatively and/or additionally, if 'DL' symbols are separated into more than one symbol sets by 'Unknown' within a given CORESET, the UE 102 may assume only the first (e.g., the earliest) 'DL' OFDM symbol set is valid for monitoring of a PDCCH associated with the given CORESET.

Figure 12A:
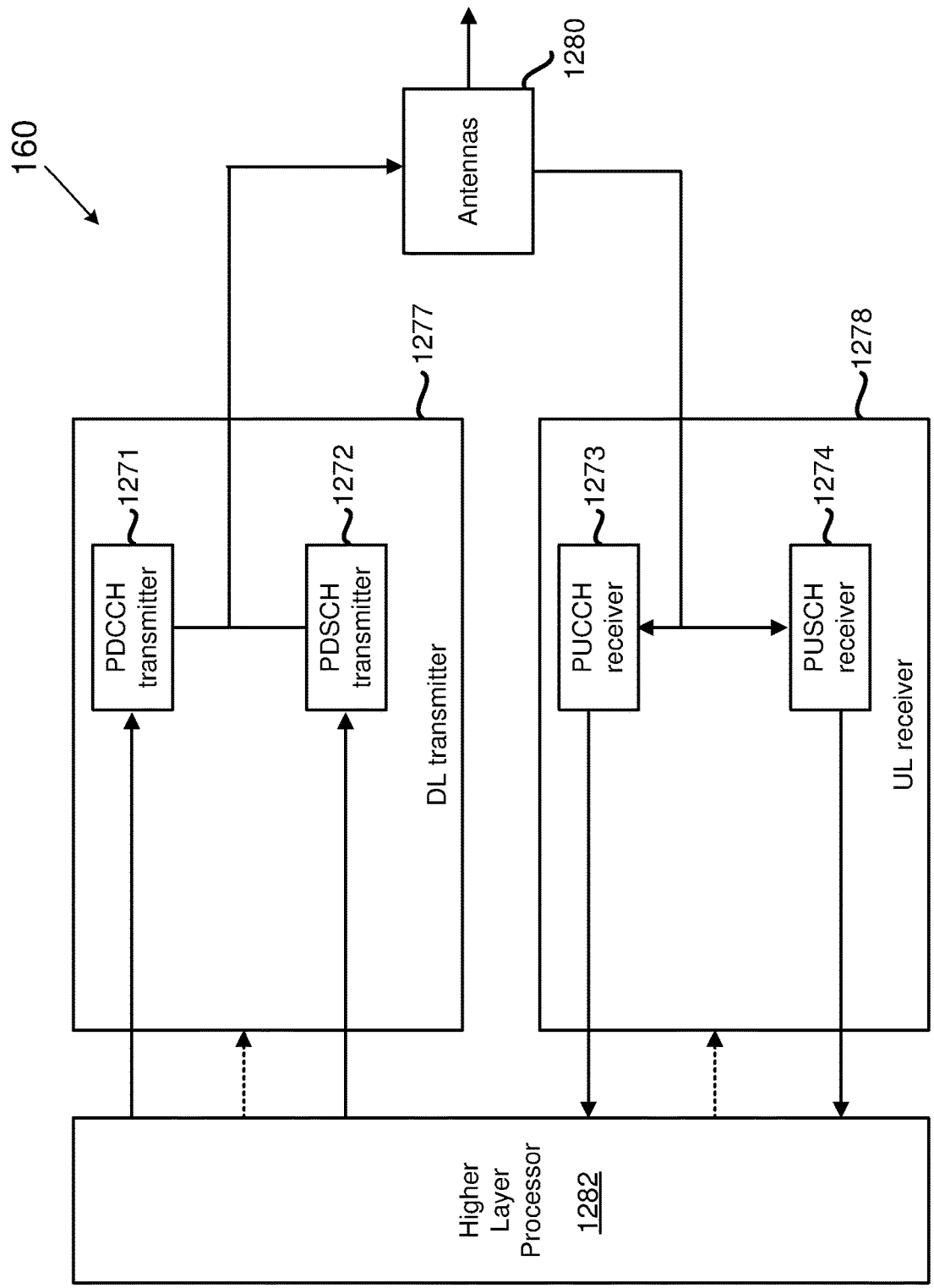
FIG. 12A is a block diagram illustrating one implementation of a gNB.

FIG. 12A is a block diagram illustrating one implementation of a gNB 160. The gNB 160 may include a higher layer processor 1282, a DL transmitter (DL transmitting circuitry) 1277, a UL receiver (UL receiving circuitry) 1278, and antennas 1280. The DL transmitter 1277 may include a PDCCH transmitter (PDCCH transmitting circuitry) 1271 and a PDSCH transmitter (PDSCH transmitting circuitry) 1272. The UL receiver 1278 may include a PUCCH receiver (PUCCH receiving circuitry) 1273 and a PUSCH receiver (PUSCH receiving circuitry) 1274. The higher layer processor 1282 may manage physical layer's behaviors (the DL transmitter 1277's and the UL receiver 1278's behaviors) and provide higher layer parameters to the physical layer. The higher layer processor 1282 may obtain transport blocks from the physical layer. The higher layer processor 1282 may send/acquire higher layer messages such as an RRC message and MAC message to/from a UE's higher layer. The higher layer processor 1282 may provide the PDSCH transmitter 1272 transport blocks and provide the PDCCH transmitter 1271 transmission parameters related to the transport blocks. The UL receiver 1278 may receive multiplexed uplink physical channels and uplink physical signals via receiving antennas and de-multiplex them. The PUCCH receiver 1273 may provide the higher layer processor UCI. The PUSCH receiver 1274 may provide the higher layer processor 1282 received transport blocks.

Figure 12B:
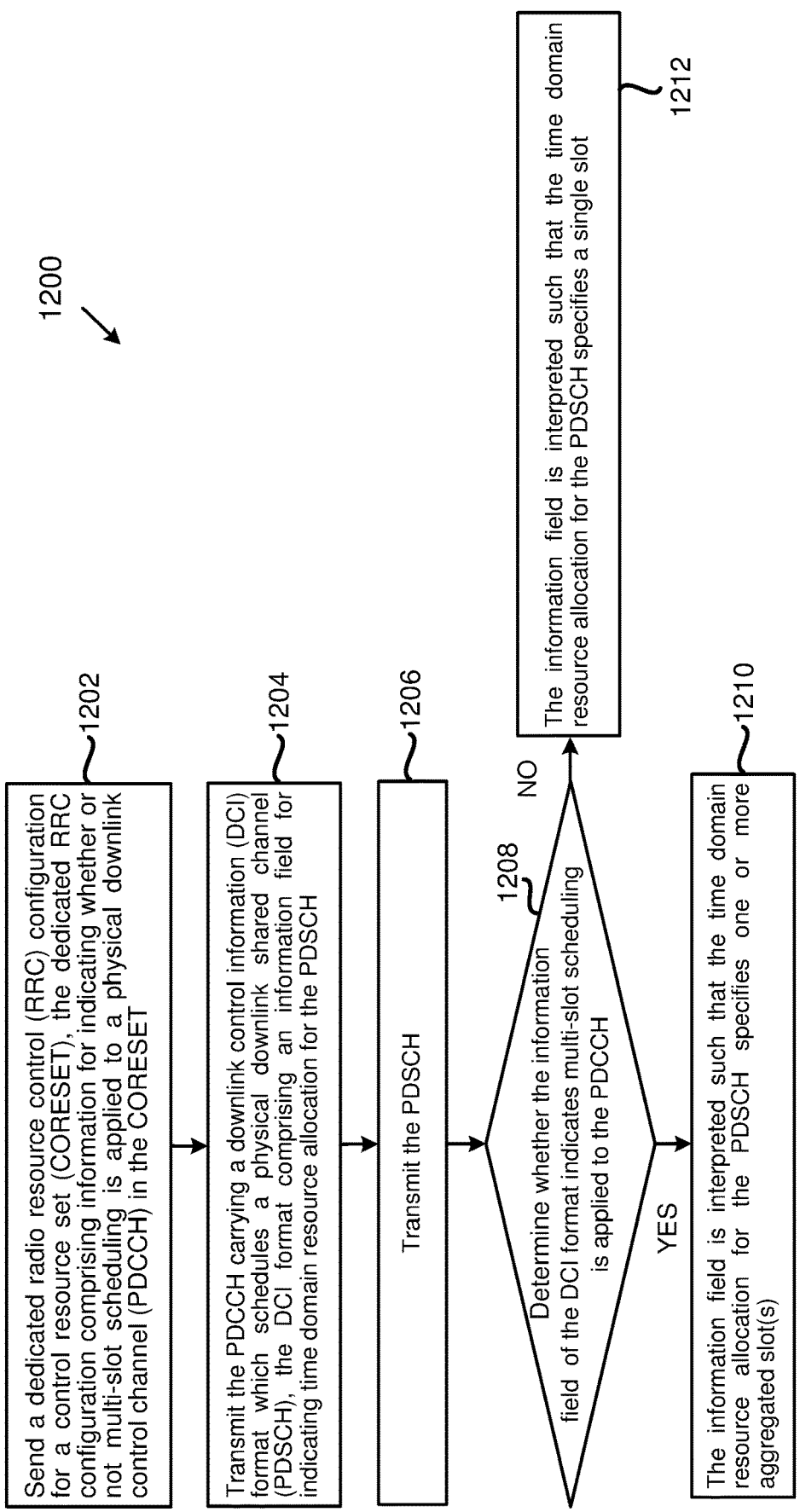
FIG. 12B is a flowchart diagram of a method performed by the gNB in FIG. 12A.

FIG. 12B is a flowchart diagram of a method performed by the gNB 160 in FIG. 12A. As illustrated in the flowchart 1200, action 1202 includes sending a dedicated radio resource control (RRC) configuration for a control resource set (CORESET), the dedicated RRC configuration comprising information for indicating whether or not multi-slot scheduling is applied to a physical downlink control channel (PDCCH) in the CORESET. Action 1204 includes transmitting the PDCCH carrying a downlink control information (DCI) format which schedules a physical downlink shared channel (PDSCH), the DCI format comprising an information field for indicating time domain resource allocation for the PDSCH. Action 1206 includes transmitting the PDSCH. Action 1208 includes determining whether or not the information field of the DCI format indicates multi-slot scheduling is applied to the PDCCH. If the information indicates the multi-slot scheduling is applied, the flowchart 1200 proceeds to action 1210, in which the information field is interpreted such that the time domain resource allocation for the PDSCH specifies one or more aggregated slot(s). If the information indicates the multi-slot scheduling is not applied, the flowchart 1200 proceeds to action 1212, in which the information field is interpreted such that the time domain resource allocation for the PDSCH specifies a single slot.

It should be noted that, in the flowchart 1200, the order and/or use of the actions 1202, 1204, 1206, 1208, 1210 and 1212 may be modified without departing from the scope of the present application. In addition, further details of one or more of the actions 1202, 1204, 1206, 1208, 1210 and 1212 will be discussed with reference to at least one of FIGS. 14-30 of the present application.

Figure 12C:
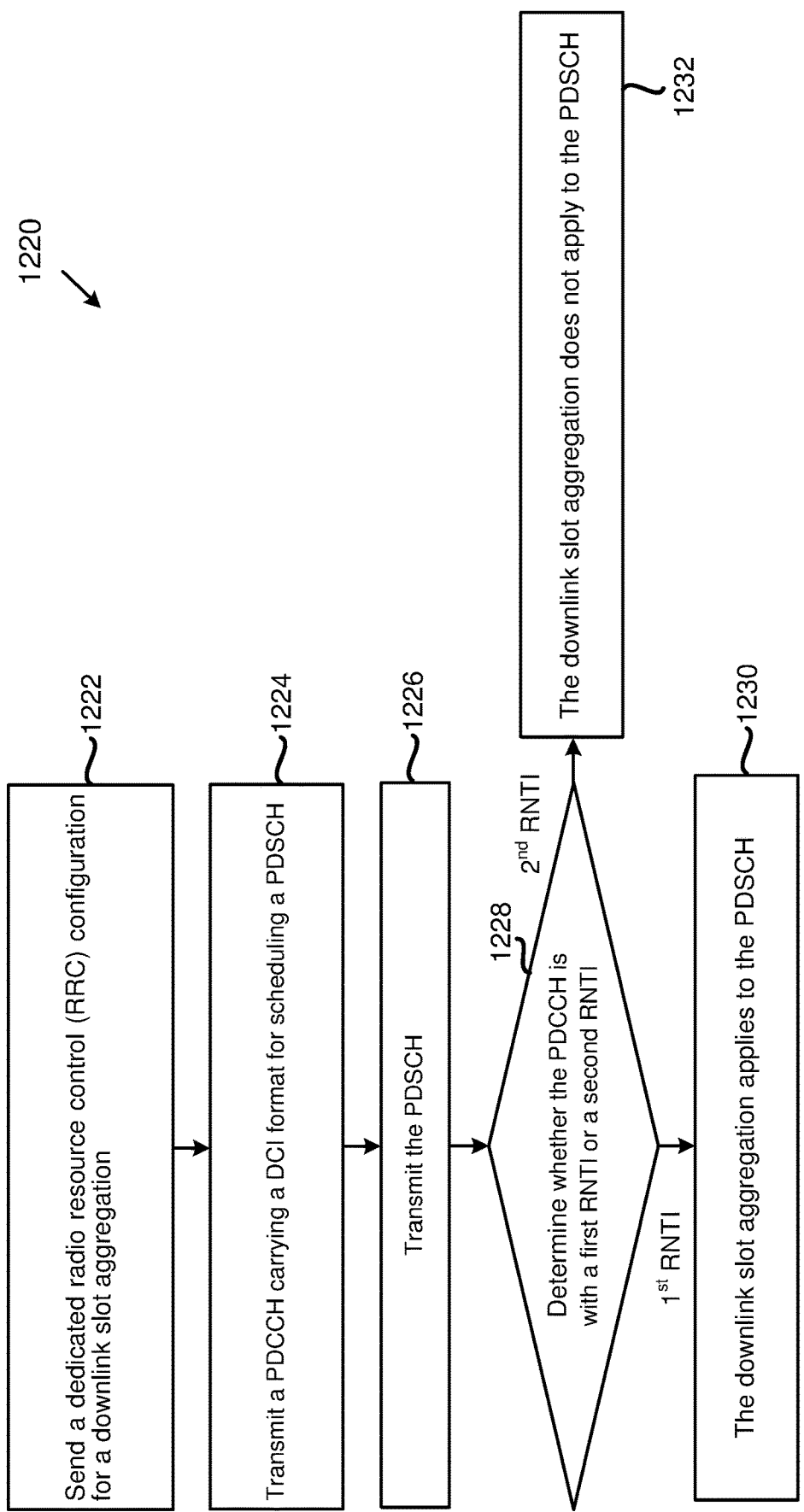
FIG. 12C is a flowchart diagram of another method performed by the gNB in FIG. 12A.

FIG. 12C is a flowchart diagram of a method performed by the gNB 160 in FIG. 12A. As illustrated in the flowchart 1220, action 1222 includes sending (e.g., through the higher layer processor 1282) a dedicated RRC configuration for a downlink slot aggregation. Action 1224 includes transmitting (e.g., through PDCCH transmitting circuitry 1271) a PDCCH carrying a DCI format for scheduling a PDSCH. Action 1226 includes transmitting (e.g., through the PDSCH transmitting circuitry 1272) the PDSCH. Action 1228 includes determining whether the PDCCH is with a first RNTI or a second RNTI. If the PDCCH is with the first RNTI, the flowchart 1220 proceeds to action 1230, in which the downlink slot aggregation applies to the PDSCH. If the PDCCH is with the second RNTI, the flowchart 1220 proceeds to action 1232, in which the downlink slot aggregation does not apply to the PDSCH.

It should be noted that, in the flowchart 1220, the order and/or use of the actions 1222, 1224, 1226, 1228, 1230 and 1232 may be modified without departing from the scope of the present application. In addition, further details of one or more of the actions 1222, 1224, 1226, 1228, 1230 and 1232 will be discussed with reference to at least one of FIGS. 14-30 of the present application.

Figure 13A:
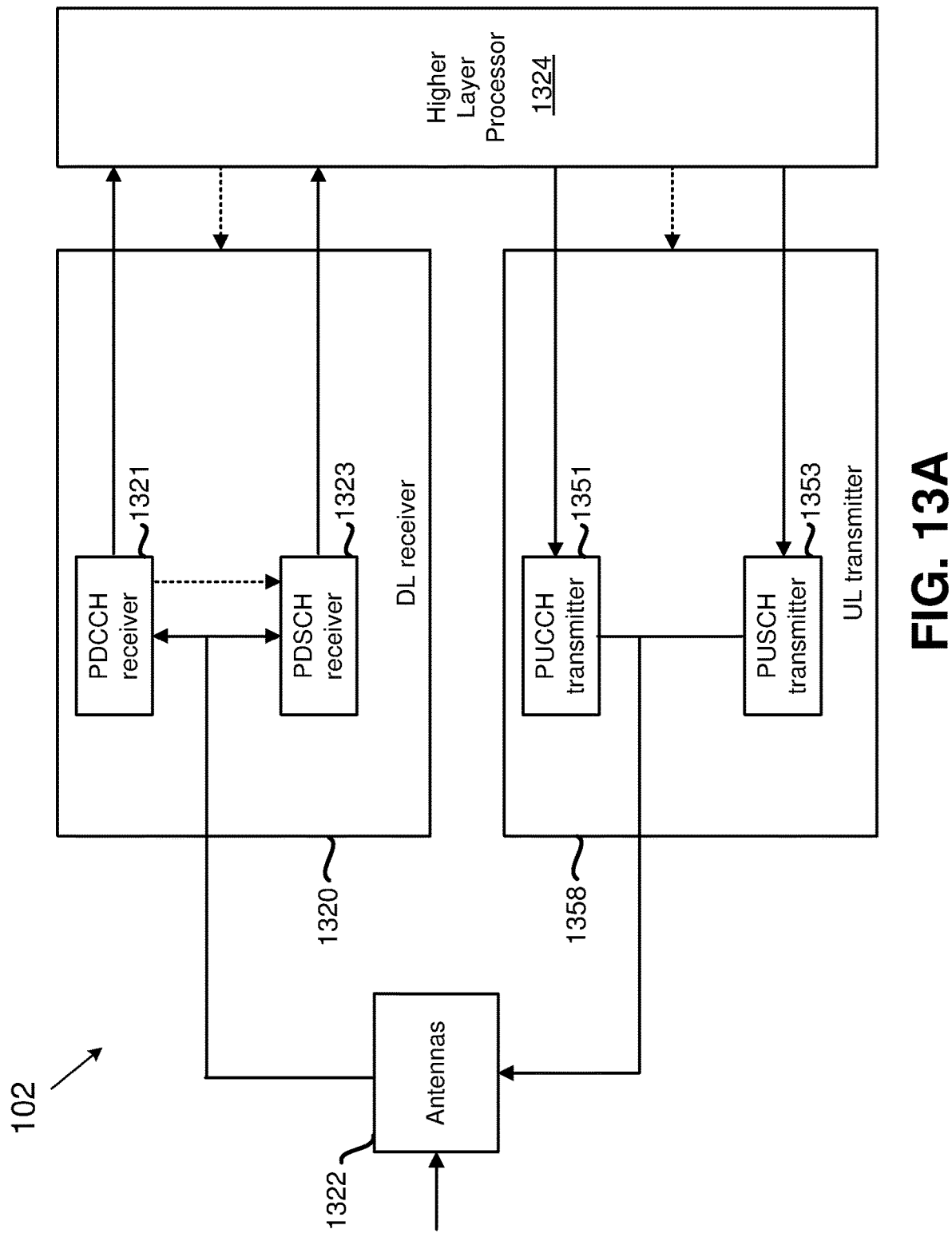
FIG. 13A is a block diagram illustrating one implementation of a UE.

FIG. 13A is a block diagram illustrating one implementation of a UE 102. The UE 102 may include a higher layer processor 1324, a UL transmitter 1358, a DL receiver 1320, and antennas 1322. The UL transmitter 1358 may include a PUCCH transmitter (PUCCH transmitting circuitry) 1351 and a PUSCH transmitter (PUSCH transmitting circuitry) 1353. The DL receiver 1320 may include a PDCCH receiver (PDCCH receiving circuitry) 1321 and a PDSCH receiver (PDSCH receiving circuitry) 1323. The higher layer processor 1324 may manage physical layer's behaviors (the UL transmitter 1358's and the DL receiver 1320's behaviors) and provide higher layer parameters to the physical layer. The higher layer processor 1324 may obtain transport blocks from the physical layer. The higher layer processor 1324 may send/acquire higher layer messages such as an RRC message and MAC message to/from a UE's higher layer. The higher layer processor 1324 may provide the PUSCH transmitter 1353 transport blocks and provide the PUCCH transmitter 1351 UCI. The DL receiver 1320 may receive multiplexed downlink physical channels and downlink physical signals via receiving antennas and de-multiplex them. The PDCCH receiver 1321 may provide the higher layer processor 1324 DCI. The PDSCH receiver 1323 may provide the higher layer processor 1324 received transport blocks.

For downlink data transmission, the UE 102 may attempt blind decoding of one or more PDCCH (also referred to just as control channel) candidates. This procedure is also referred to as monitoring of PDCCH. The PDCCH may carry a DCI format which schedules PDSCH (also referred to just as shared channel or data channel). The gNB 160 may transmit PDCCH and the corresponding PDSCH in a downlink slot. Upon the detection of the PDCCH in a downlink slot, the UE 102 may receive the corresponding PDSCH in the downlink slot. Otherwise, the UE 102 may not perform PDSCH reception in the downlink slot.

Figure 13B:
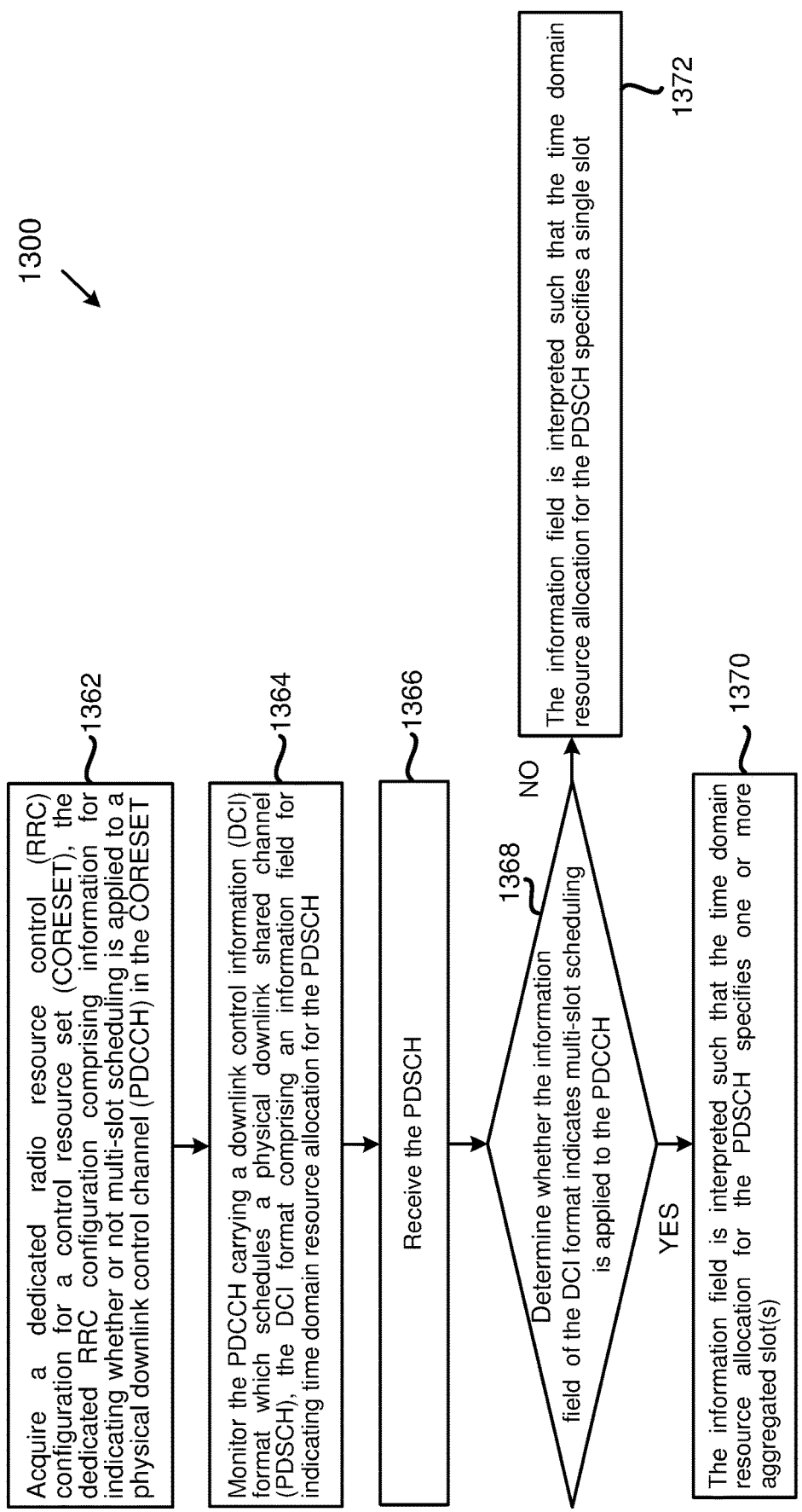
FIG. 13B is a flowchart diagram of a method performed by the UE in FIG. 13A.

FIG. 13B is a flowchart diagram of a method performed by the UE 102 in FIG. 13A. As illustrated in the flowchart 1300, action 1362 includes acquiring a dedicated radio resource control (RRC) configuration for a control resource set (CORESET), the dedicated RRC configuration comprising information for indicating whether or not multi-slot scheduling is applied to a physical downlink control channel (PDCCH) in the CORESET. Action 1364 includes monitoring the PDCCH carrying a downlink control information (DCI) format which schedules a physical downlink shared channel (PDSCH), the DCI format comprising an information field for indicating time domain resource allocation for the PDSCH. Action 1366 includes receiving the PDSCH. Action 1368 includes determining whether or not the information field of the DCI format indicates multi-slot scheduling is applied to the PDCCH. If the information indicates the multi-slot scheduling is applied, the flowchart 1300 proceeds to action 1370, in which the information field is interpreted such that the time domain resource allocation for the PDSCH specifies one or more aggregated slot(s). If the information indicates the multi-slot scheduling is not applied, the flowchart 1300 proceeds to action 1372, in which the information field is interpreted such that the time domain resource allocation for the PDSCH specifies a single slot.

It should be noted that, in the flowchart 1300, the order and/or use of the actions 1362, 1364, 1366, 1368, 1370 and 1372 may be modified without departing from the scope of the present application. In addition, further details of one or more of the actions 1362, 1364, 1366, 1368, 1370 and 1372 will be discussed with reference to at least one of FIGS. 14-30 of the present application.

Figure 13C:
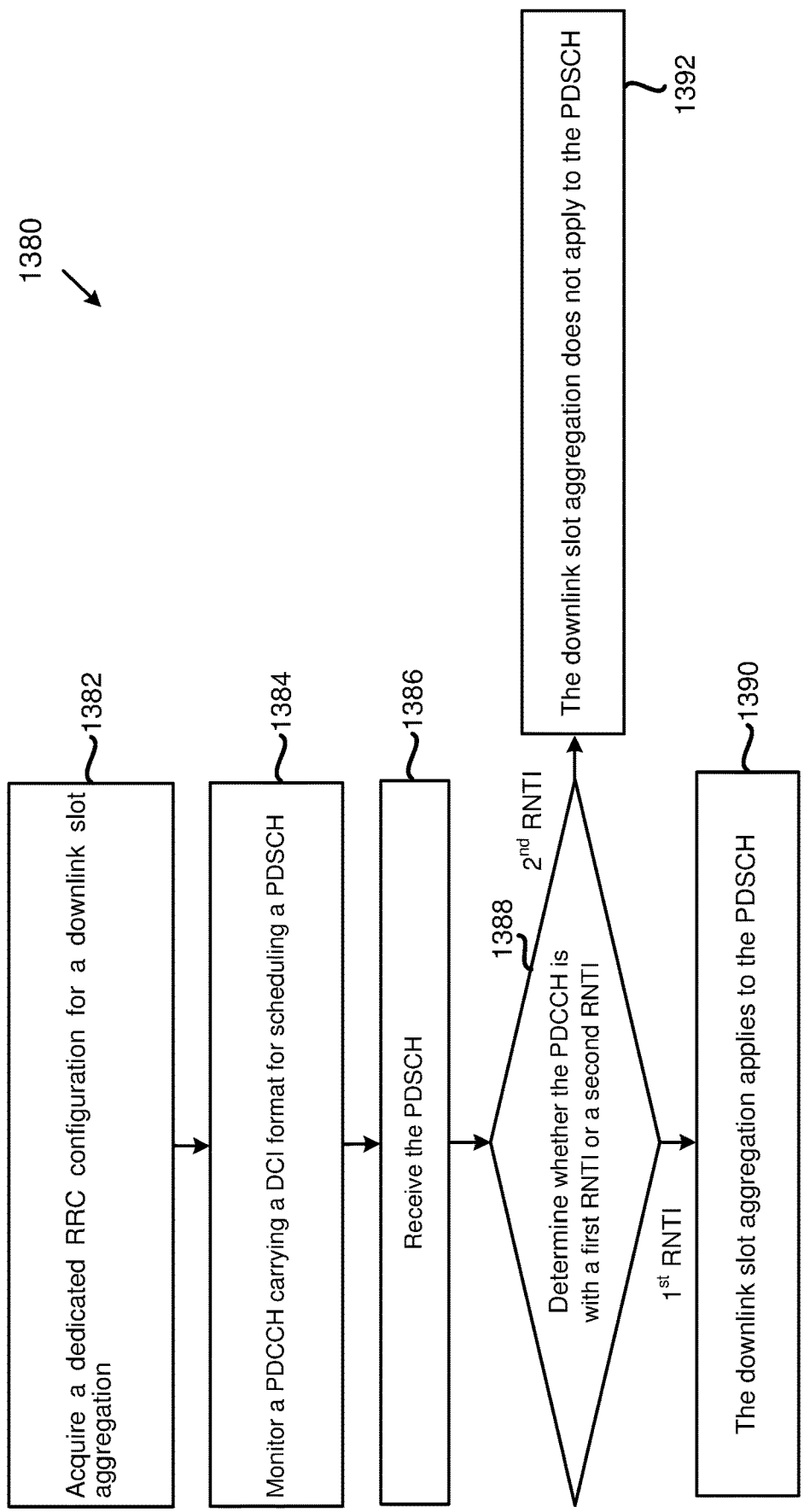
FIG. 13C is a flowchart diagram of another method performed by the UE in FIG. 13A.

FIG. 13C is a flowchart diagram of a method performed by the UE 102 in FIG. 13A. As illustrated in the flowchart 1380, action 1382 includes acquiring (e.g., through the higher layer processor 1324) a dedicated RRC configuration for a downlink slot aggregation. Action 1384 includes monitoring (e.g., through the PDCCH receiving circuitry 1321) a PDCCH carrying a DCI format for scheduling a PDSCH. Action 1386 includes receiving (e.g., through the PDSCH receiving circuitry 1323) the PDSCH. Action 1388 includes determining (e.g., through the higher layer processor 1324) whether or not the information field of the DCI format indicates multi-slot scheduling is applied to the PDCCH. If the PDCCH is with the first RNTI, the flowchart 1380 proceeds to action 1390, in which the downlink slot aggregation applies to the PDSCH. If the PDCCH is with the second RNTI, the flowchart 1380 proceeds to action 1392, in which the downlink slot aggregation does not apply to the PDSCH.

It should be noted that, in the flowchart 1380, the order and/or use of the actions 1382, 1384, 1386, 1388, 1390 and 1392 may be modified without departing from the scope of the present application. In addition, further details of one or more of the actions 1382, 1384, 1386, 1388, 1390 and 1392 will be discussed with reference to at least one of FIGS. 14-30 of the present application.

Figure 14:
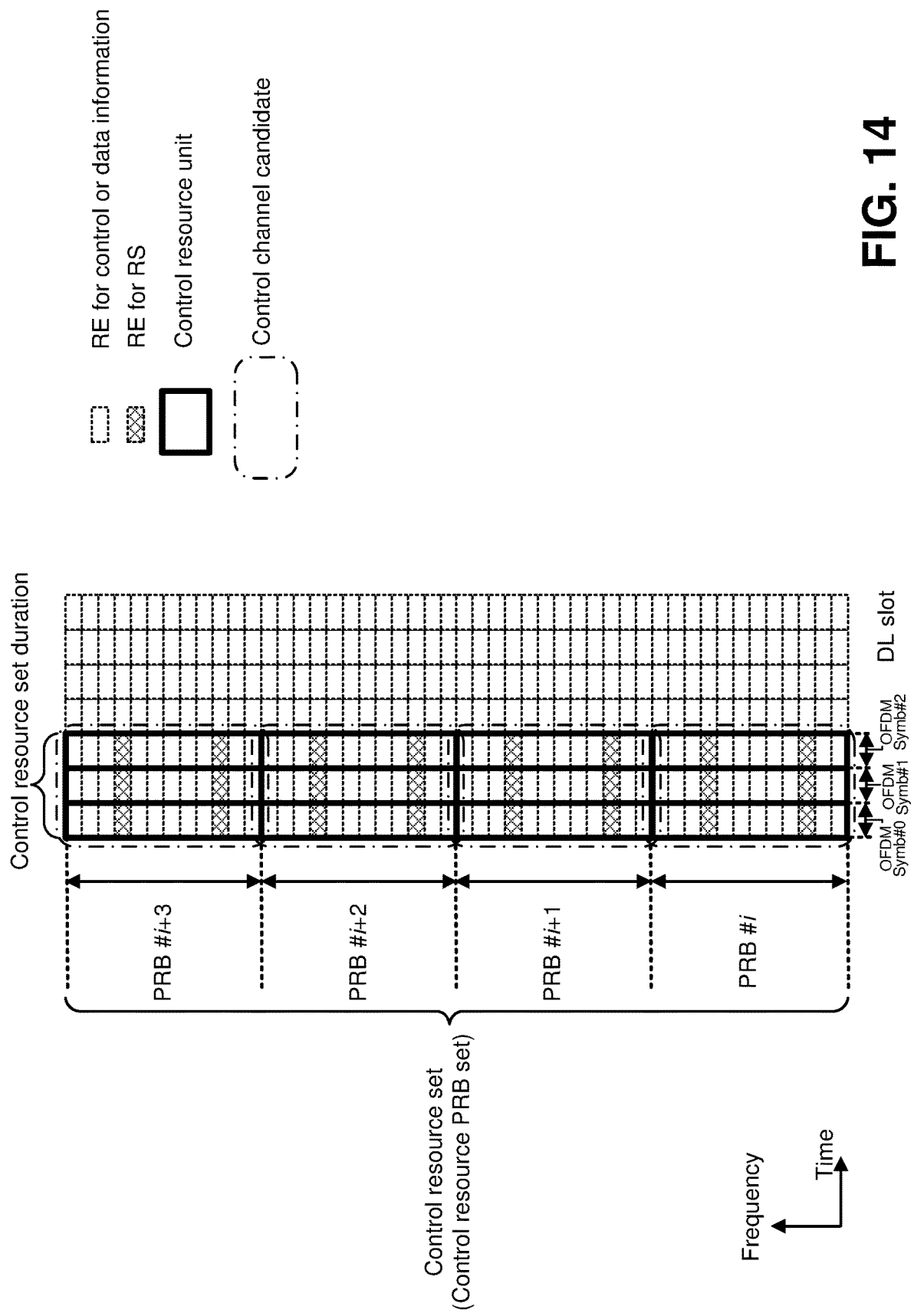
FIG. 14 illustrates an example of control resource unit and reference signal structure.

FIG. 14 illustrates an example of control resource unit and reference signal structure. A control resource set (CORESET) may be defined, in frequency domain, as a set of physical resource block(s) (PRBs). For example, a control resource set may include PRB # i, PRB # i+1, PRB # i+2, and PRB # i+3 in frequency domain. The control resource set may also be defined, in time domain, as a set of OFDM symbol(s). It may also be referred to as a duration of the control resource set or just control resource set duration. For example, a control resource set may include three OFDM symbols, OFDM symbol #0, OFDM symbol #1, and OFDM symbol #2, in time domain. The UE 102 may monitor PDCCH in one or more control resource sets. The PRB set may be configured with respect to each control resource set through dedicated RRC signaling (e.g., via dedicated RRC reconfiguration). The control resource set duration may also be configured with respect to each control resource set through dedicated RRC signaling.

In the control resource unit and reference signal structure shown in FIG. 14, control resource units are defined as a set of resource elements (REs). Each control resource unit includes all REs (e.g., 12 REs) within a single OFDM symbol and within a single PRB (e.g., consecutive 12 subcarriers). REs on which reference signals (RSs) are mapped may be counted as those REs, but the REs for RSs are not available for PDCCH transmission and the PDCCH are not mapped on the REs for RSs.

Multiple control resource units may be used for a transmission of a single PDCCH. In other words, one PDCCH may be mapped the REs which are included in multiple control resource units. FIG. 14 shows the example that the UE 102 performing blind decoding of PDCCH candidates assuming that multiple control resource units located in the same frequency carries one PDCCH. However, RSs for the PDCCH demodulation may be contained in all of the resource units on which the PDCCH is mapped. The UE 102 may not be allowed to assume that the RSs contained in a given resource unit can be used for demodulation of a different resource unit. This may increase diversity gain for PDCCH transmission, since the gNB 160 may apply different precoders for different resource units. Alternatively, the UE 102 may be allowed to assume that the RSs contained in a given resource unit can be used for demodulation of a different resource unit within the same PRB. This may improve channel estimation accuracy, since the gNB 160 may apply the same precoders for more RSs within a PRB.

Figure 15:
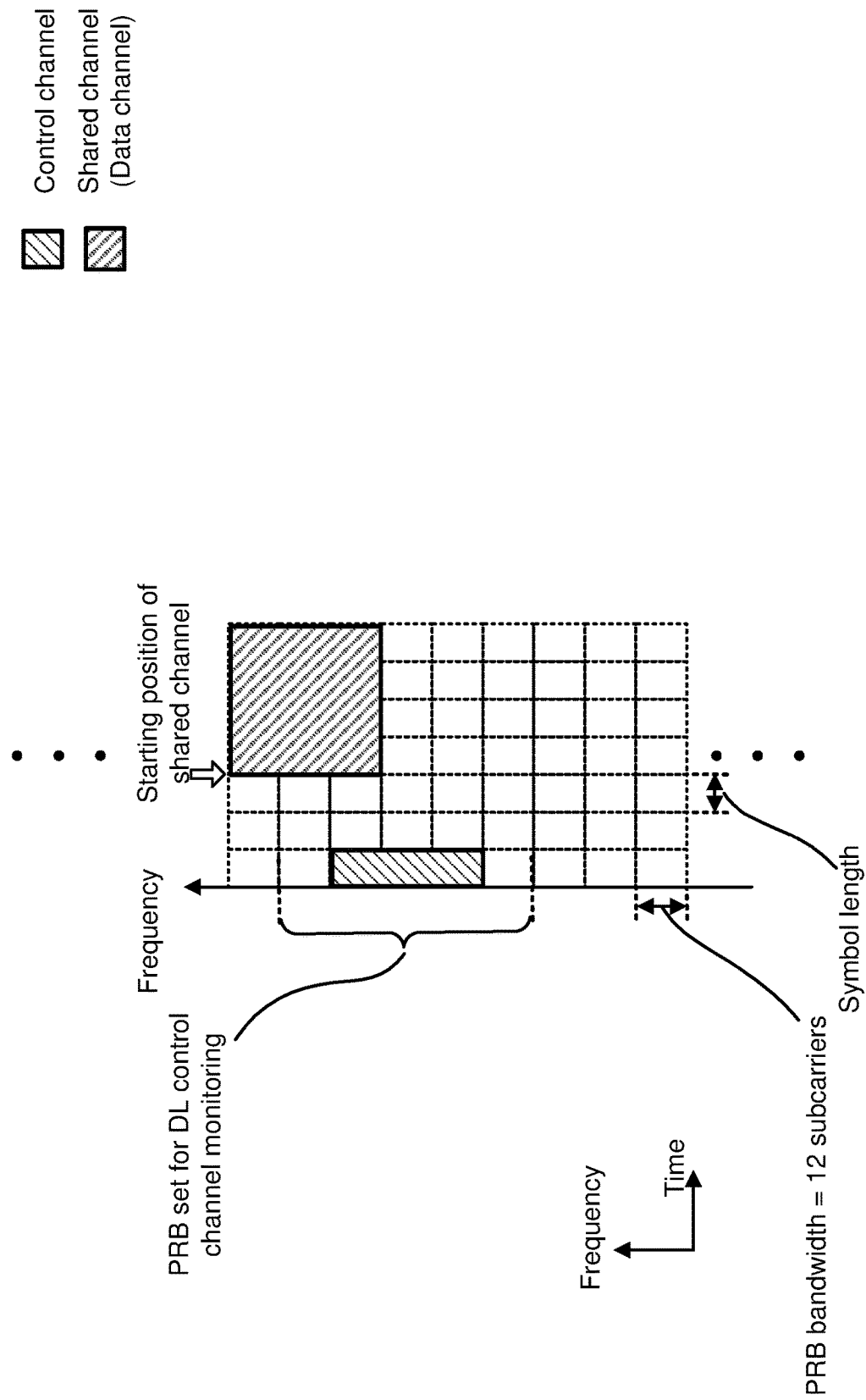
FIG. 15 illustrates an example of control channel and shared channel multiplexing.

FIG. 15 illustrates an example of control channel and shared channel multiplexing. There are several approaches to determine the starting position (e.g., the index of starting OFDM symbol) of PDSCH.

The first approach is that the starting position of PDSCH is indicated via the scheduling PDCCH. More specifically, the DCI format which schedules PDSCH may include an information field for indicating the starting position of the scheduled PDSCH. This option provides the most flexible data starting position adjustment.

The second approach is that a channel other than the PDCCH indicates the starting position of the scheduled PDSCH. For example, some common control channel may be transmitted on OFDM symbol #0 in a slot, and the common control channel may include an information field for indicating the starting position of PDSCHs in the same slot. Given that this common control channel is monitored by multiple UEs 102, this approach reduces the duplication on transmission of the same control information and brings more efficient signaling.

The third approach is that the PDSCH starting position is implicitly determined from the control channel resources that are used for the scheduling PDCCH transmission. For example, PDSCH may start on the symbol right after the last symbol on which the scheduling PDCCH is mapped. This option does not cause additional control signaling overhead.

The UE 102 may include a higher layer processor which is configured to acquire a dedicated RRC message. The dedicated RRC message may include information indicating a control resource set duration and/or a downlink slot aggregation. The UE 102 may also include PDCCH receiving circuitry which is configured to monitor a PDCCH based on the control resource set duration. The PDCCH may carry a DCI format which schedules a PDSCH in the same slot. The PDCCH may carry an RNTI for indicating whether a downlink slot aggregation applies to the PDSCH. The DCI format may also include an information field indicating a PDSCH starting position. The UE 102 may also include PDSCH receiving circuitry which is configured to receive the PDSCH based on the PDSCH starting position, upon the detection of the corresponding PDCCH.

The gNB 160 may include a higher layer processor which is configured to send a dedicated RRC message. The dedicated RRC message may include information indicating a control resource set duration and/or a downlink slot aggregation. The gNB 160 may also include PDCCH transmitting circuitry which is configured to transmit a PDCCH based on the control resource set duration. The PDCCH may carry a DCI format which schedules a PDSCH in the same slot. The PDCCH may carry an RNTI for indicating whether a downlink slot aggregation applies to the PDSCH. The DCI format may also include an information field indicating a PDSCH starting position. The gNB 160 may also include PDSCH transmitting circuitry which is configured to transmit the PDSCH based on the PDSCH starting position, upon the transmission of the corresponding PDCCH.

Figure 16:
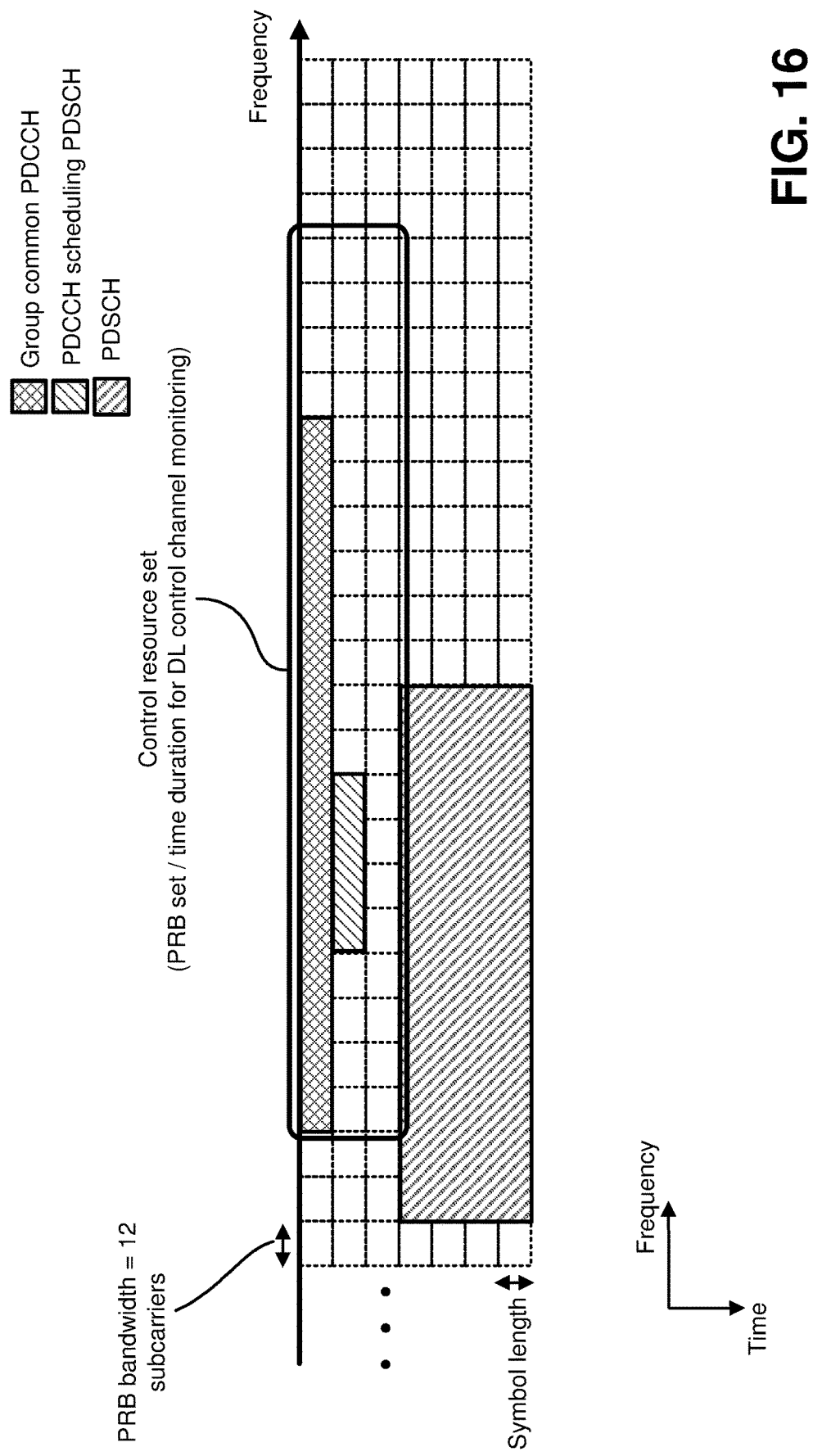
FIG. 16 illustrates another example of control channel and shared channel multiplexing.

FIG. 16 illustrates an example of control channel and shared channel multiplexing. More specifically, UE 102 may monitor PDCCH candidates in a control resource set. The set of PDCCH candidates may be also referred to as search space. The control resource set may be defined by a PRB set in frequency domain and a duration in units of OFDM symbol in time domain.

For each serving cell, higher layer signaling such as common RRC messages or UE dedicated RRC messages may configure the UE 102 with one or more PRB set(s) for PDCCH monitoring. For each serving cell, higher layer signaling such as common RRC messages or UE dedicated RRC messages may also configure the UE 102 with the control resource set duration for PDCCH monitoring.

Each control resource set may include a set of control channel elements (CCEs). Each CCE may be mapped to a set of resource element groups (REGs) which includes a plurality of REs. In the control resource set, a group-common PDCCH may be transmitted by the gNB 160. If the UE 102 is configured to monitor the group-common PDCCH by higher layer signaling, the UE 102 may monitor the group-common PDCCH. The group-common PDCCH may be a PDCCH with CRC scrambled by the certain RNTI, which may be fixed or be configured independently from C-RNTI. Alternatively, the group-common PDCCH may be a PDCCH with DCI format of which the RNTI field value is set to the certain RNTI.

In the control resource set, a UE-specific PDCCH may be transmitted by the gNB 160. The UE 102 may monitor the PDCCH. The UE-specific PDCCH may be a PDCCH with CRC scrambled by the C-RNTI of the UE 102. Alternatively, the UE-specific PDCCH may be a PDCCH with DCI format of which the RNTI field value is set to the C-RNTI of the UE 102. Monitoring of PDCCH may mean attempting to decode each of the PDCCH candidates in the set according to the monitored DCI formats. The UE 102 may monitor common search space within the control resource set. The UE 102 may also monitor UE-specific search space within the control resource set. The UE-specific PDCCH may be monitored in both the common and UE-specific search spaces while the group-common PDCCH may be monitored in only the common search space. The UE-specific PDCCH may schedules a PDSCH. The UE 102 may not be required to monitor the group-common PDCCH in the slot where the UE 102 would have a scheduled uplink transmission using at least the first OFDM symbol of the slot.

Upon detection of the UE-specific PDCCH, the UE 102 may receive the corresponding PDSCH. The DCI format of the UE-specific PDCCH may include one or more information field(s), for example, a field for indicating resource block assignment for the PDSCH, a field for indicating the starting position (the index of first OFDM symbol which carries the PDSCH) of the PDSCH, a field for indicating modulation order and transport block size for the PDSCH, etc. The group-common PDCCH, the UE-specific PDCCH and the PDSCH may be mapped to different RE sets so that they do not collide with one another.

The group-common PDCCH may include one or more information field(s). An example of the field is a field for indicating UE-specific PDCCH blind decoding attempt reduction. More specifically, this information field may indicate the control resource set duration, which overrides the control resource set duration configured by higher layer signaling. The control resource set duration indicated by the group-common PDCCH may have to be equal to or shorter than the control resource set duration configured by higher layer signaling. Alternatively, this information field may indicate how much the control resource set duration is shortened from the one configured by higher layer signaling. In this case, the updated control resource set duration is derived by an offset indicated by the group-common PDCCH and the original control resource set duration configured by higher layer signaling. Yet alternatively, the reduction of PDCCH candidates may be indicated by using a percentage a from the total number of the PDCCH candidates. More specifically, if the group-common PDCCH indicates the value of a for aggregation level L for a serving cell, the corresponding number of PDCCH candidates may be given by $M^{(L)} = \text{round}(a \times M^{(L)}_{full})$, where $M^{(L)}_{full}$ is the original (e.g., maximum) number of PDCCH candidates for aggregation level L.

Another example of the field is a field for indicating frequency and/or time resources for which the UE 102 does not assume any signals. More specifically, for these resources, the UE 102 may not monitor PDCCH, the UE 102 may not receive PDSCH, the UE 102 may assume valid CSI-RS transmission for CSI measurement, the UE 102 may assume valid Primary Synchronization Signal (PSS)/Secondary Synchronization Signal (SSS)/Physical Broadcast Channel (PBCH) transmission, and the UE 102 may not transmit any uplink signals/channels including PUCCH, PUSCH and SRS.

The UE 102 detecting the group-common PDCCH may follow the sub-slot structure indicated by the group-common PDCCH. For example, if the UE 102 is configured with sub-slot based communication, the UE 102 may monitor PDCCH on the first OFDM symbol of each sub-slot which is defined by the indicated sub-slot structure. In other words, the group-common PDCCH may indicate the OFDM symbol set on which the UE 102 monitors PDCCH candidates for a sub-slot based communication. If the UE 102 is configured with sub-slot based communication and the UE 102 has detected a PDCCH, the UE 102 may receive the corresponding PDSCH mapped to one or more sub-slots which are defined by the indicated sub-slot structure. If the UE 102 is configured with sub-slot based communication and the UE 102 has received a PDSCH, the UE 102 may transmit the corresponding HARQ-ACK on PUCCH mapped to one or more sub-slots which are defined by the indicated sub-slot structure. The sub-slot structure may also be able to define whether each sub-slot is a downlink sub-slot, uplink sub-slot or GP sub-slot.

If the UE 102 detects the group-common PDCCH in slot i, and the UE 102 has received prior to slot i a PDCCH which schedules either PDSCH reception, CSI-RS reception, PUSCH transmission or SRS transmission in slot i, the UE 102 may drop the PDSCH reception, CSI-RS reception, PUSCH transmission or SRS transmission in slot i if the assigned resources (e.g., OFDM symbols) for the PDSCH reception, CSI-RS reception, PUSCH transmission or SRS transmission is not in line with the sub-slot structure indicated by the group-common PDCCH. For example, the UE 102 would receive a PDSCH using a given sub-slot in a given slot, but a group-common PDCCH in the slot may indicate the sub-slot structure in which there is no such sub-slot in the slot. In this case, the UE 102 may assume the PUSCH is not transmitted. For another example, the UE 102 would transmit a sub-slot based PUSCH in a given slot, but a group-common PDCCH in the slot may indicate the sub-slot structure in which there is no sub-slot in the slot. In this case, the UE 102 may drop the sub-slot based PUSCH transmission.

Figure 17:
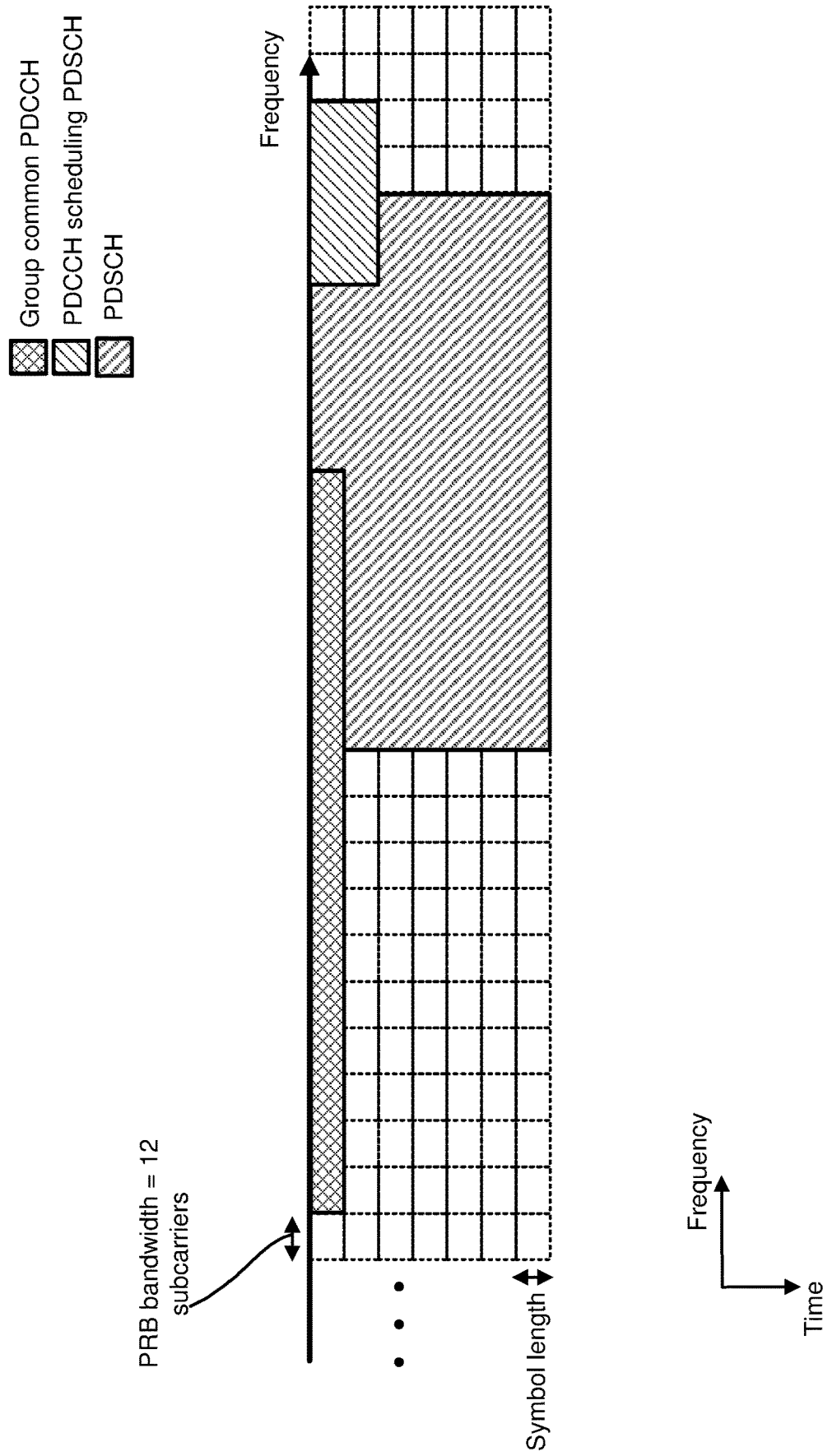
FIG. 17 illustrates another example of control channel and shared channel multiplexing.

FIG. 17 illustrates another example of control channel and shared channel multiplexing. In this instance, the starting position of the PDSCH is set to the first OFDM symbol of the slot, and the PRBs assigned to the PDSCH partially overlaps the PDCCH which has been detected by the UE 102.

For the PRBs overlapping the PDCCH which schedules the PDSCH, the starting position of PDSCH declines to the OFDM symbols right after the last symbols on which the PDCCH is mapped or to the OFDM symbols right after the original control resource set duration. In this case, the PDSCH may not be mapped to any resource element in the first several OFDM symbols of an RB pair on any antenna port when the first several OFDM symbols of the RB pair is used for PDCCH transmission on any antenna port, and the resource elements occupied by the PDCCH may not be counted in the PDSCH mapping and not used for transmission of the PDSCH.

For the PRBs overlapping the group-common PDCCH, the starting position of PDSCH declines to the OFDM symbols (e.g., the second OFDM symbol) right after the symbol (e.g., the first OFDM symbol) on which the PDCCH is mapped or to the OFDM symbols right after the original control resource set duration. In this case, the PDSCH may not be mapped to any resource element in the first several OFDM symbol(s) of an RB pair on any antenna port when the first several OFDM symbol(s) of the RB pair is used for PDCCH transmission on any antenna port, and the resource elements occupied by the group-common PDCCH may be counted in the PDSCH mapping but not used for transmission of the PDSCH. Alternatively, those resource elements may not be counted in the PDSCH mapping and not used for transmission of the PDSCH.

Figure 18:
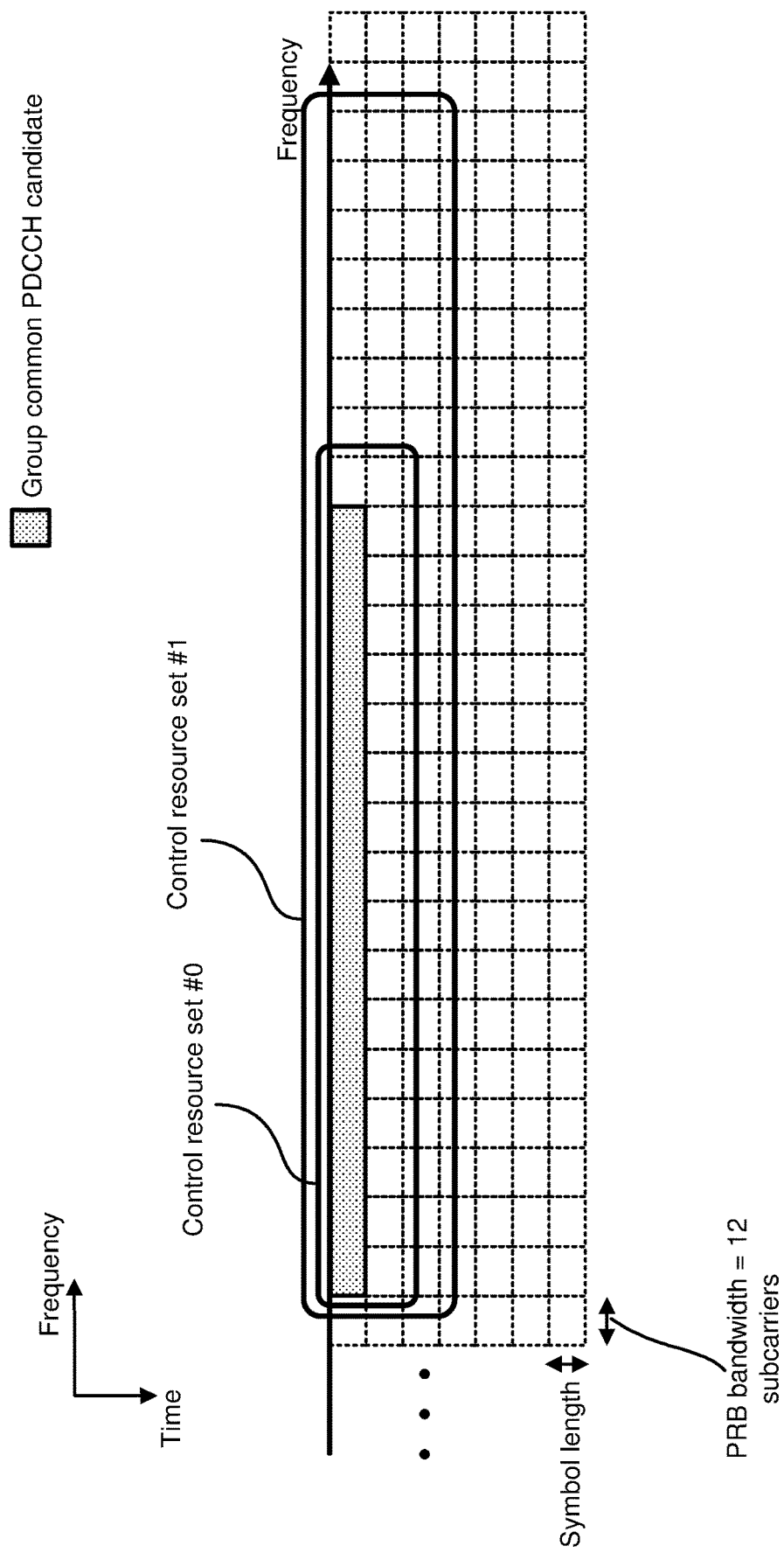
FIG. 18 illustrates an example of control channel mapping.

FIG. 18 illustrates an example of control channel mapping. For each serving cell, higher layer signaling may configure a UE with Q control resource set(s). For control resource set q, 0≤q<Q, the configuration may include (a) a first OFDM symbol provided by higher layer parameter, (b) a number of consecutive OFDM symbols provided by higher layer parameter, (c) a set of resource blocks provided by higher layer parameter, (d) a CCE-to-REG mapping provided by higher layer parameter, (e) a REG bundle size, in case of interleaved CCE-to-REG mapping, provided by higher layer parameter, and (f) antenna port quasi-collocation provided by higher layer parameter. In the example shown in FIG. 18, gNB 160 configures more than one control resource set to the UE 102, and at least two configured control resource sets (e.g., control resource set #0 and control resource set #1) are fully or partially overlapping. This may cause the case where a PDCCH candidate in the control resource set #0 fully overlaps a PDCCH candidate in the control resource set #1.

In this case, if the UE 102 does a successful decoding of such PDCCH candidate, the UE 102 may assume the detected PDCCH candidate belongs to control resource set #0 (e.g., the one with a smaller control resource set index). If the UE 102 is configured to monitor a common search space in the control resource set #0, a candidate in the common search space may fully overlap a PDCCH candidate in UE-specific search space of the control resource set #1. In this case, if the UE 102 does a successful decoding of such PDCCH candidate, the UE 102 may assume the detected PDCCH candidate is the PDCCH of the common search space. Alternatively, the UE 102 may assume the detected PDCCH candidate is the PDCCH of the UE-specific search space.

If the UE 102 is configured to monitor a group-common PDCCH in the control resource set #0, the candidate of the group-common PDCCH may fully overlap a PDCCH candidate in the control resource set #1. In this case, if the UE 102 does a successful decoding of such PDCCH candidate, the UE 102 may assume the detected PDCCH candidate is the group-common PDCCH. Alternatively, the UE 102 may assume the detected PDCCH candidate is the PDCCH of the control resource set #1 (e.g., the other PDCCH than the group-common PDCCH).

The UE 102 may include a higher layer processor which is configured to acquire a dedicated RRC message. The dedicated RRC message may include information indicating sub-slot configuration. The UE 102 may also include first PDCCH receiving circuitry which is configured to monitor a first PDCCH in a slot. The first PDCCH may indicate sub-slot structure in the slot. The UE 102 may also include second PDCCH receiving circuitry which is configured to monitor a second PDCCH in the slot based on the sub-slot structure. The second PDCCH may schedule a sub-slot based PDSCH.

The gNB 160 may include a higher layer processor which is configured to send a dedicated RRC message. The dedicated RRC message may include information indicating sub-slot configuration. The gNB 160 may also include first PDCCH transmitting circuitry which is configured to transmit a first PDCCH in a slot. The first PDCCH may indicate sub-slot structure in the slot. The gNB 160 may also include second PDCCH transmitting circuitry which is configured to transmit a second PDCCH in the slot based on the sub-slot structure. The second PDCCH may schedule sub-slot based PDSCH.

Timing between DL assignment and corresponding DL data transmission may be indicated by a field in the DCI from a set of values, timing between UL assignment and corresponding UL data transmission may be indicated by a field in the DCI from a set of values, and timing between DL data reception and corresponding acknowledgement may be indicated by a field in the DCI from a set of values. The sets of values may be configured by higher layer signaling. Default timing(s) may be pre-defined at least for the case where the timing(s) is (are) unknown to the UE 102.

Figure 19:
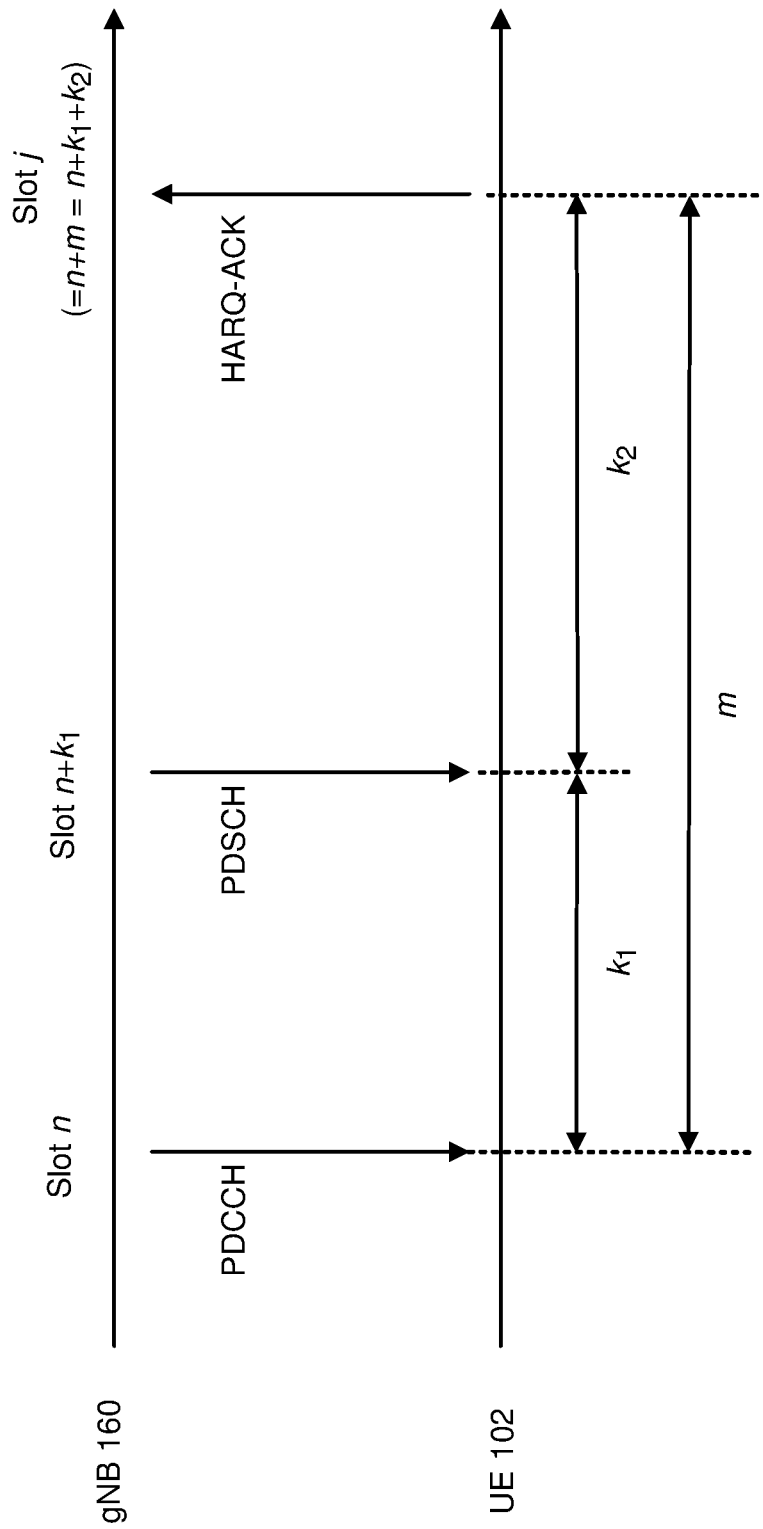
FIG. 19 illustrates an example of downlink scheduling and a Hybrid Automatic Repeat reQuest (HARQ) timeline.

FIG. 19 illustrates an example of a downlink scheduling and HARQ timeline. A PDCCH transmitted by the gNB 160 in slot n may carry a DCI format which schedules a PDSCH, the DCI format including at least two fields, the first field may indicate $k_1$ and the second field may indicate $k_2$.

The UE 102 detecting the PDCCH in slot n may receive the scheduled PDSCH in slot $n+k_1$, and then in slot $n+k_1+k_2$ the UE 102 may report HARQ-ACK corresponding to the PDSCH. Alternatively, the second field may indicate m, and the UE 102 may report the HARQ-ACK in slot n+m. In other words, upon the detection of the corresponding PDCCH in slot $i-k_1$, the UE 102 may receive a PDSCH in slot i, and the UE 102 may transmit the HARQ-ACK in slot j for the PDSCH transmission in slot $j-k_2$. Alternatively, the UE 102 may transmit the HARQ-ACK in slot j for the PDSCH transmission scheduled by the corresponding PDCCH in slot j-m.

Figure 20:
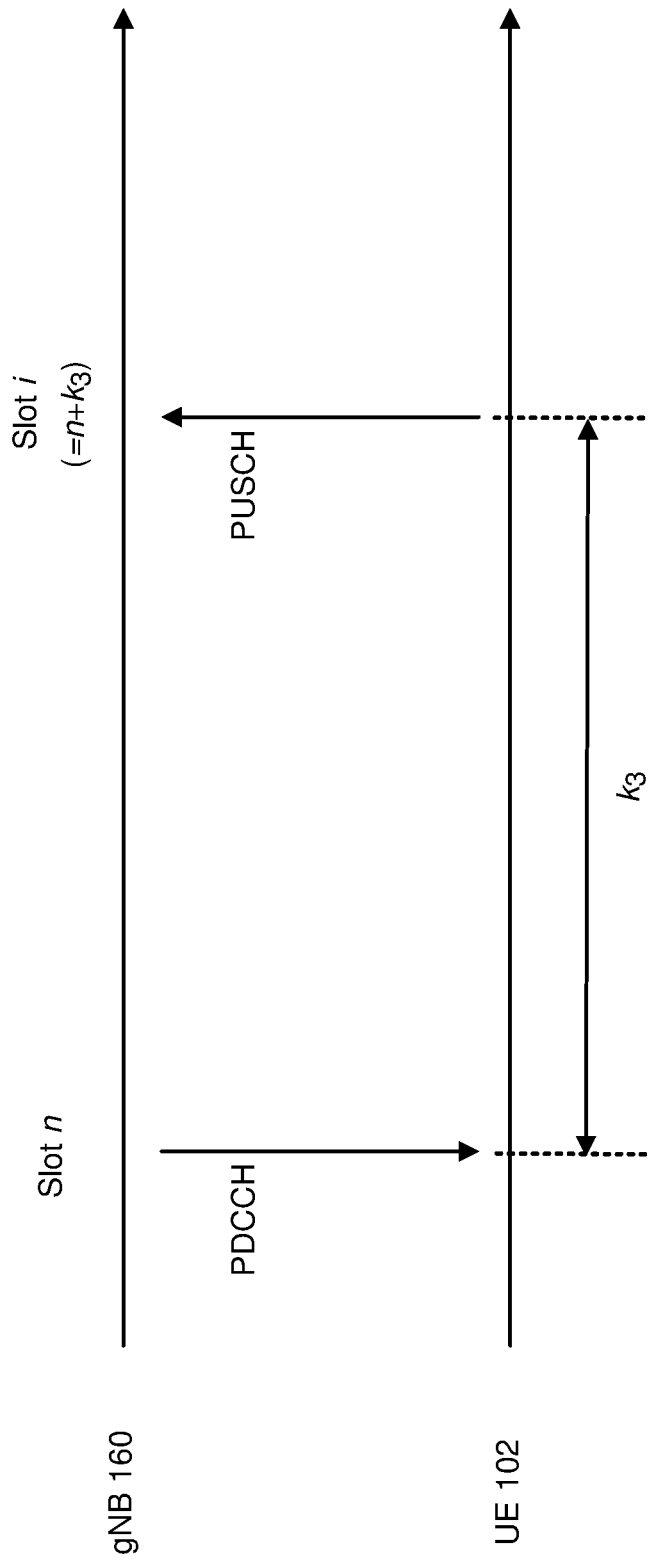
FIG. 20 illustrates an example of uplink scheduling timeline.
Figure 21:
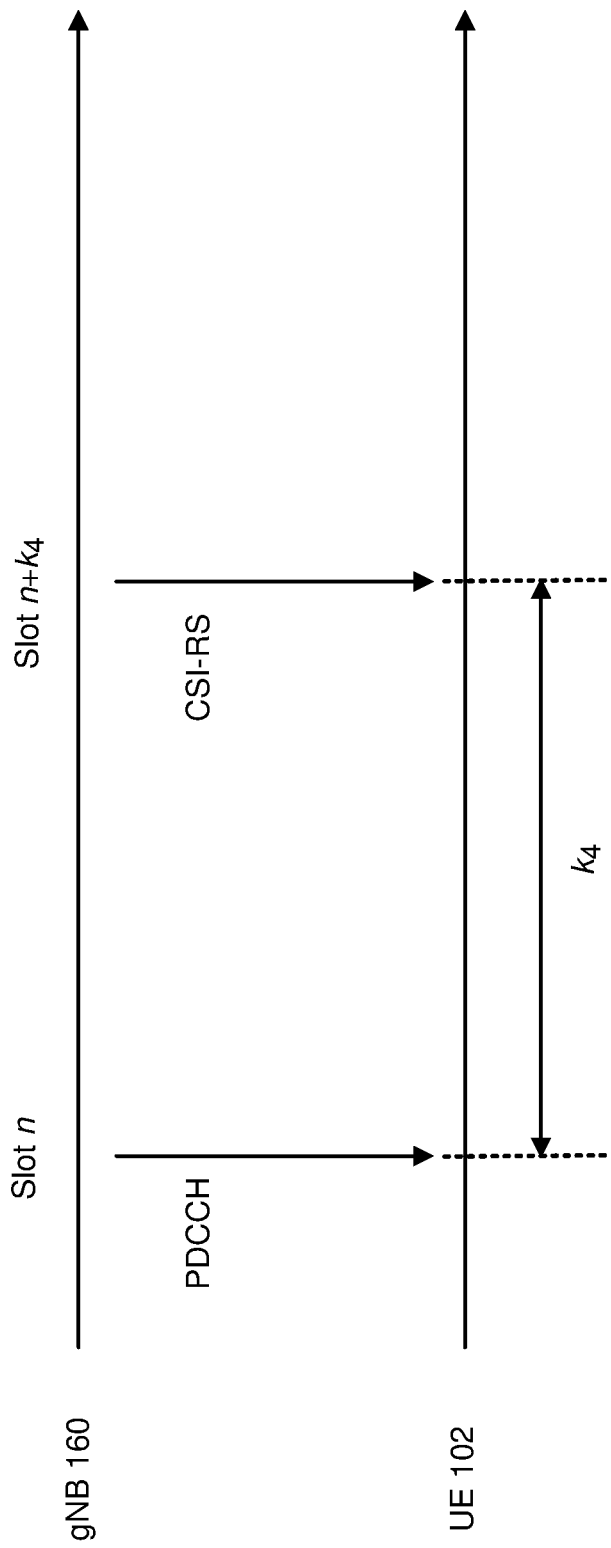
FIG. 21 illustrates an example of downlink aperiodic Channel State information-reference signal (CSI-RS) transmission timeline.

FIG. 20 illustrates an example of an uplink scheduling timeline. A PDCCH transmitted by the gNB 160 in slot n may carry a DCI format which schedules a PUSCH, the DCI format including at least a field which may indicate $k_3$. The UE 102 detecting the PDCCH in slot n may transmit the scheduled PUSCH in slot $n+k_3$. In other words, upon the detection of the corresponding PDCCH in slot $i-k_3$, the UE 102 may transmit a PUSCH in slot i, FIG. 21 illustrates an example of a downlink aperiodic CSI-RS transmission timeline. A PDCCH transmitted by the gNB 160 in slot n may carry a DCI format which indicates the presence of aperiodic CSI-RS, the DCI format including at least a field which may indicate $k_4$. The UE 102 detecting the PDCCH in slot n may assume presence of aperiodic CSI-RS in slot $n+k_4$ for CSI measurement and/or Radio Resource Management (RRM) measurement.

Figure 22:
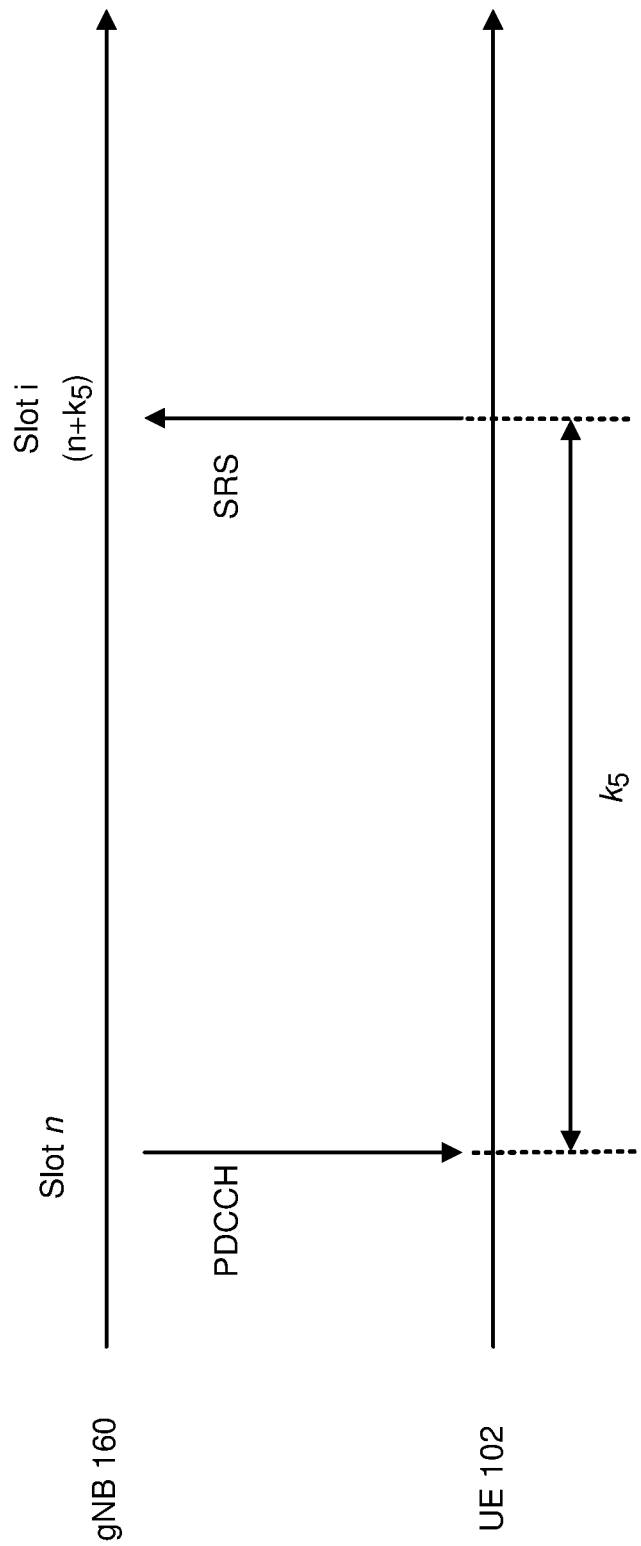
FIG. 22 illustrates an example of uplink aperiodic Sounding Reference Signals (SRS) transmission timeline.

FIG. 22 illustrates an example of an uplink aperiodic SRS transmission timeline. A PDCCH transmitted by the gNB 160 in slot n may carry a DCI format which schedules an aperiodic SRS, the DCI format including at least a field which may indicate $k_5$. The UE 102 detecting the PDCCH in slot n may transmit the scheduled aperiodic SRS in slot $n+k_5$. In other words, upon the detection of the corresponding PDCCH in slot $i-k_5$, the UE 102 may transmit aperiodic SRS in slot i.

The presence/disabling of each of above-described fields may be configured by higher layer signaling. The configurations of presence/disabling may be common among those fields. Alternatively, the presence/disabling may be separately configurable. If at least one of the fields is not present or is disabled, a default value (e.g., a predefined fixed value or a value included in system information) may be used, instead. For example, a default value for $k_1$ (e.g., in FIG. 19) may be 0, and a default value for $k_2$ or $k_3$ (e.g., in FIGS. 19 and 20) may be 4.

FIG. 23 illustrates a table specifying values for explicit timing indications. If the field is present, the UE 102 may be configured with multiple values (e.g., the first value to the fourth value) by higher layer signaling. Each of the possible values for the field (e.g., 2-bit field) may correspond to a different value among the configured values. The UE 102 may use, as a k value, the value which corresponds to the field value set in the associated field in the detected PDCCH.

FIG. 24 illustrates another table specifying values for explicit timing indications. The UE 102 may be configured with multiple values (e.g., the first value to the third value) by higher layer signaling. At least one possible value for the field (e.g., 2-bit field) may correspond to a predefined fixed value. Each of the rest of possible values for the field (e.g., 2-bit field) may correspond to a different value among the configured values.

The UE 102 may use, as a k value, the value which corresponds to the field value set in the associated field in the detected PDCCH. In this case, without configurability of the presence of the field, the gNB 160 can use the predefined fixed value so that the gNB 160 and the UE 102 share the same k value even during RRC (re)configuration for those higher-layer configured values. The predefined fixed value may depend on timing offset type. For example, the value for $k_1$ may be 0, and the value for $k_2$ or $k_3$ may be 4. Alternatively, a value indicated though system information can be used, instead of the predefined fixed value.

The UE 102 may include a higher layer processor which is configured to acquire a dedicated RRC message. The dedicated RRC message may include information indicating a first value. The UE 102 may also include PDCCH receiving circuitry which is configured to monitor a PDCCH with a DCI format in a slot n. The DCI format may include an information field indicate one of at least two values, one value corresponding to a fixed value, the other value corresponding to the first value. The UE 102 may set k to the indicated value. The UE 102 may also include PDSCH receiving circuitry which is configured to, upon the detection of the PDCCH, receive a PDSCH in a slot n+k.

The gNB 160 may include a higher layer processor which is configured to send a dedicated RRC message. The gNB 160 may also include PDCCH transmitting circuitry which is configured to transmit a PDCCH with a DCI format in a slot n. The DCI format may include an information field indicate one of at least two values, one value corresponding to a fixed value, the other value corresponding to the first value. The gNB 160 may set k to the indicated value. The gNB 160 may also include PDSCH transmitting circuitry which is configured to, upon the transmission of the PDCCH, transmit a PDSCH in a slot n+k.

In some cases, the UE 102 may not have to monitor group common PDCCHs. The group common PDCCH may be defined as a PDCCH carrying DCI format with CRC scrambled by a certain RNTI (e.g., Group Common-(GC-) RNTI). There may be several types of GC-RNTIs. One of the GC-RNTIs may be configured by dedicated RRC configuration. Another one of the GC-RNTIs may be indicated from a pre-determined RNTI set by system information (e.g., MIB, minimum SIB). For example, before RRC connection is established, the UE 102 may not monitor group common PDCCHs. In this instance, the UE 102 may be able to receive PDCCH and also PDSCH which is scheduled by the PDCCH. In addition, the UE 102 may be able to transmit PUCCH corresponding to the PDSCH and transmit PUSCH which is scheduled by the PDCCH. This behavior can be referred to as a default behavior. On the other hand, there may be the case that, even if the UE 102 is configured with monitoring a group common PDCCH, the UE 102 does not receive (e.g., failed to receive) the configured group common PDCCH. In this instance, the UE 102 may follow the UE behavior which is defined for the case when the UE 102 may not monitor group common PDCCHs. Alternatively, the UE 102 may follow a different UE behavior, for example the UE 102 does not monitor UE-specific PDCCH nor receive PDSCH. Moreover, the UE 102 may not transmit PUCCH or PUSCH. Yet alternatively, the gNB 160 may send the UE 102 a dedicated RRC signaling which indicates a UE behavior for this instance. For example, the dedicated RRC signaling may indicate one of the above mentioned behaviors.

As described in FIGS. 10 and 11, the UE 102 and gNB 160 may support flexible time domain resource allocation schemes including flexible scheduling and/or HARQ-ACK timing as well as flexible downlink (e.g., PDSCH) and/or uplink (PUSCH) time durations. The UE 102 and gNB 160 may support at least three time domain resource allocation schemes (e.g., single-slot based scheme, multi-slot based scheme, and non-slot based scheme).

For the single-slot based scheme, the gNB 160 may inform the UE 102 of at least starting symbol and ending symbol in the slot as well as which slot it applies to (e.g., slot offset).

With the multi-slot based scheme, a single transport block (TB) may be transmitted multiple times using the aggregated slots. For the multi-slot based scheme, there may be three options in terms of information that the gNB 160 informs the UE 102. Option 1 is that the gNB 160 informs the UE 102 of starting symbol and ending symbol of each slot of the aggregated slots as well as the starting slot and ending slot where it is applied to (e.g., slot offset). In Option 1, the starting symbol and ending symbol of each slot may be set individually and/or independently among the aggregated slots. Option 2 is that the gNB 160 informs the UE 102 of starting symbol and ending symbol of a slot as well as the starting slot and ending slot where it is applied to (e.g., slot offset). In Option 2, the same set of the starting symbol and ending symbol applies to all of the aggregated slots. Option 3 is that the gNB 160 informs the UE 102 of starting symbol and starting slot as well as ending symbol and ending slot. A dedicated RRC configuration message may include information (e.g., information element for multi-slot based scheduling configuration) for indicating one of Option 1 to Option 3. In this case, the gNB 160 may configure one of Option 1 to Option 3 to the UE 102, and the UE 102 may assume the configured option.

A transport block size (TBS) may be determined by at least parameters including the number of layers the codeword is mapped onto, time/frequency resource the PDSCH/PUSCH is scheduled, modulation order and coding rate. The time/frequency resource the PDSCH/PUSCH is scheduled may be the total number of REs available for the PDSCH/PUSCH. Alternatively, it may be given by a reference number of REs per slot per PRB and the number of PRB(s) for carrying the PDSCH/PUSCH. For multi-slot scheduling, the TBS may be determined by the parameters for the first slot, and the TBS may apply to the second and later slot(s). Alternatively, the TBS may be determined by the parameter sets of the aggregated slot, and the TBS may apply to all of the aggregated slots.

For the single-slot based scheduling, physical layer may deliver HARQ-ACK to MAC layer for every slot. For the multi-slot based scheduling, physical layer may also deliver HARQ-ACK to MAC layer with once per slot. Alternatively, for the multi-slot based scheduling, physical layer may also deliver HARQ-ACK to MAC layer with once per aggregated slots.

With the non-slot based scheme, a single transport block (TB) may be transmitted in a PDSCH/PUSCH which is allowed to be mapped to the resource grid across a slot boundary. For the non-slot based scheme, starting symbol and ending symbol may be informed to the UE 102. There may be two options in terms of information that the gNB 160 informs the UE 102 regarding starting symbol. Option S1 is that the gNB 160 informs the UE 102 of starting symbol of a slot and the UE 102 is also informed of which slot it applies to (e.g., slot offset). Option S2 is that the gNB 160 informs the UE 102 of symbol number from the start of the PDCCH where scheduling PDCCH is included. A dedicated RRC configuration message may include information (e.g., information element for non-slot based scheduling configuration) for indicating one of Option S1 and Option S2. In this case, the gNB 160 may configure one of Option S1 and Option S2 to the UE 102, and the UE 102 may assume the configured option. Similarly, there may be two options in terms of information that the gNB 160 informs the UE 102 regarding ending symbol. Option E1 is that the gNB 160 informs the UE 102 of ending symbol of a slot and the UE 102 is also informed of which slot it applies to. Option E2 is that the gNB 160 informs the UE 102 of the number of symbols (e.g., PDSCH/PUSCH duration) from the starting symbol. A dedicated RRC configuration message may include information (e.g., information element for non-slot based scheduling configuration) for indicating one of Option E1 and Option E2. In this case, the gNB 160 may configure one of Option E1 and Option E2 to the UE 102, and the UE 102 may assume the configured option.

It should be noted that the starting symbol is the earliest symbol of the PDSCH or PUSCH including DMRS symbol. Moreover, the ending symbol is the latest symbol of the PDSCH or PUSCH in a slot.

When the slot offset is configured by RRC signaling (e.g., via a dedicated RRC configuration message), a single offset value may apply to those schemes. Alternatively, whether the slot offset is configured by RRC signaling and, if so, what value is configured to the slot offset may be independent of one another between those schemes. In addition, the value range of the slot offset for the single-slot based scheme or the one for the non-slot based scheme may be different (e.g., relatively smaller) from the one for the multi-slot based scheme. The value range of the slot offset for the single-slot based scheme may be different from the one for the non-slot based scheme.

The scheduling scheme may change dynamically. A DCI format may include an information field for indicating which scheme is used. The UE 102 may assume the indicated scheme to derive time domain PDSCH/PUSCH resource allocation from the time domain PDSCH/PUSCH resource allocation field. Alternatively, those scheduling schemes may correspond to different DCI formats. For example, DCI formats 1A, 1B and 1C may use the single-slot based, multi-slot based and non-slot based schemes, respectively. The UE 102 may assume the scheme corresponding to the detected DCI format to derive time domain PDSCH/PUSCH resource allocation from the time domain PDSCH/PUSCH resource allocation field.

The scheduling scheme may be configured semi-statically. A dedicated RRC configuration message may include information for indicating whether the multi-slot based scheme is enabled and/or information for indicating whether the non-slot based scheme is enabled. It may be noted that a single-slot based scheme may always be enabled irrespective of the RRC configuration.

The configuration(s) of whether the multi-slot based scheme is enabled and/or whether the non-slot based scheme is enabled may be configured per CORESET (e.g., the configuration(s) may be included in a CORESET configuration). In this case, the UE 102 may assume the configured scheme to derive time domain PDSCH/PUSCH resource allocation from the time domain PDSCH/PUSCH resource allocation field in a PDCCH in the CORESET if configured. Otherwise, the UE 102 may assume the single-slot based scheduling scheme. The bit size of the time domain PDSCH/PUSCH resource allocation field and the DCI format size of PDCCH candidates monitored in the CORESET may change depending on the configuration(s).

The configuration(s) of whether the multi-slot based scheme is enabled and/or whether the non-slot based scheme is enabled may be configured separately for PDSCH and PUSCH. Alternatively, a single configuration may apply to both PDSCH and PUSCH.

The configuration(s) of whether the multi-slot based scheme is enabled and/or whether the non-slot based scheme is enabled may be configured per DCI format (e.g., the configuration(s) may be included in a DCI format configuration). In this case, the UE 102 may assume the configured scheme to derive time domain PDSCH/PUSCH resource allocation from the time domain PDSCH/PUSCH resource allocation field in the DCI format if configured. Otherwise, the UE 102 may assume the single-slot based scheduling scheme. The bit size of the time domain PDSCH/PUSCH resource allocation field and the total size of the DCI format may change depending on the configuration(s).

The configuration(s) of whether the multi-slot based scheme is enabled and/or whether the non-slot based scheme is enabled may be configured per RNTI (e.g., the configuration(s) may be included in an RNTI configuration). In this case, the configuration may apply to DCI format(s) with a specific RNTI (e.g., C-RNTI), while the other configuration may apply to DCI format(s) with another specific RNTI (e.g., SPS C-RNTI).

The above configuration(s) may apply to DCI format(s) in USS only. The DCI format(s) monitored in CSS (e.g., one or more type(s) of CSSs) may always use a single-slot based scheduling scheme. The above configuration(s) may apply to DCI format(s) with certain RNTI(s) (e.g., C-RNTI) only. DCI format(s) with the other RNTI(s) (e.g., SI-RNTI, P-RNTI) may always use a single-slot based scheduling scheme.

A PDCCH may be mapped contiguously or non-contiguously in frequency with localized or distributed mapping of REGs to a CCE (in the physical domain). A CCE may be mapped to REGs with interleaved or non-interleaved REG indices within a one or more control resource sets (also referred to as CORESET). A CCE may be mapped to REGs with interleaved or non-interleaved REG indices within a control resource set. A UE 102 may assume that precoding granularity is multiple RBs in the frequency domain, if configured. Moreover, a UE 102 may assume that precoding granularity is multiple OFDM symbols in the time domain, if configured. In order to increase these precoding granularities, an REG bundling may be defined. The UE 102 may assume that the same precoder is used for the REGs in a REG bundle and that the REGs in a REG bundle are contiguous in frequency and/or time. PDCCH may support REG bundling per CCE. REG bundle size(s) in frequency and/or time domain may be configured by dedicated RRC signaling. REG bundle size(s) for PDCCH on CSS may be fixed or may be indicated by system information which may be carried by MIB or SIB. The REG bundle size could be 1 (e.g., 1 RB in frequency domain, 1 OFDM symbol in time domain), where this may be a default REG bundle size configuration (e.g., REG bundle size if the UE 102 is not configured with any REG bundle size), or this case may also be realized by a configuration of REG bundling disabling.

The UE 102 may monitor a set of PDCCH candidates within one or more control resource sets (also referred to as CORESET). The gNB 160 may transmit PDCCH intended for the UE 102 in the control resource set. A single control resource set may be defined by a resource block (RB) set (e.g., a control resource RB set) in frequency domain and a control resource set duration in time domain. RBs contained by the RB set may be contiguous or may be non-contiguous. If the RB set is limited to be contiguous, the RB set may be determined by a starting RB index (e.g., starting position in frequency domain) and the number of RBs (e.g., bandwidth, also known as length in frequency domain) included in the RB set. If the RB set is not limited to be contiguous, the RB set may be expressed by bitmap information, where "1" indicates the corresponding RB is included in the RB set and "0" indicates the corresponding RB is not included in the RB set. The length of the bitmap sequence may depend on granularity of RB allocation for the RB set. For example, if each bit of the bitmap sequence corresponds to a different RB, the length may be equal to M, the number of RBs within the system bandwidth of the serving cell. If each bit of the bitmap sequence corresponds to a different RB group, which consists of N contiguous RBs, the length may be equal to ceiing(M/N).

A PDCCH may include one or more control-channel elements (CCEs). A control-resource set consists of $N^{CORESET}_{RB}$ resource blocks in the frequency domain and $N^{CORESET}_{symb} \in \{1,2,3\}$ symbols in the time domain where $N^{CORESET}_{symb}=3$ may be supported only when downlink system bandwidth for the serving cell is wider than or equal to a threshold value. A control-channel element may include 6 resource-element groups (REGs) where a resource-element group equals one resource block. Resource-element groups within a control-resource set are numbered in increasing order in a time-first manner, starting with 0 for the first OFDM symbol and the lowest-numbered resource block in the control resource set. Each control-resource set may be associated with one CCE-to-REG mapping only. The CCE-to-REG mapping for a control-resource set can be interleaved or non-interleaved. The CCE-to-REG mapping may be described by REG bundles. REG bundle i may defined as REGs {i+1, ..., i+L−1} where L is the REG bundle size. CCE j consists of REG bundles {f(j),f(j+1), ..., f(j+6/L−1)} where f(·) is an interleaver. For non-interleaved CCE-to-REG mapping, L=6 and f(i)=i. For interleaved CCE-to-REG mapping, $L \in \{2,6\}$ for $N^{CORESET}_{symb}=1$ and $L \in \{N^{CORESET}_{symb},6\}$ for $N^{CORESET}_{symb}=\{2,3\}$. The UE can assume the same precoding being used across a REG bundle.

Figure 25A:
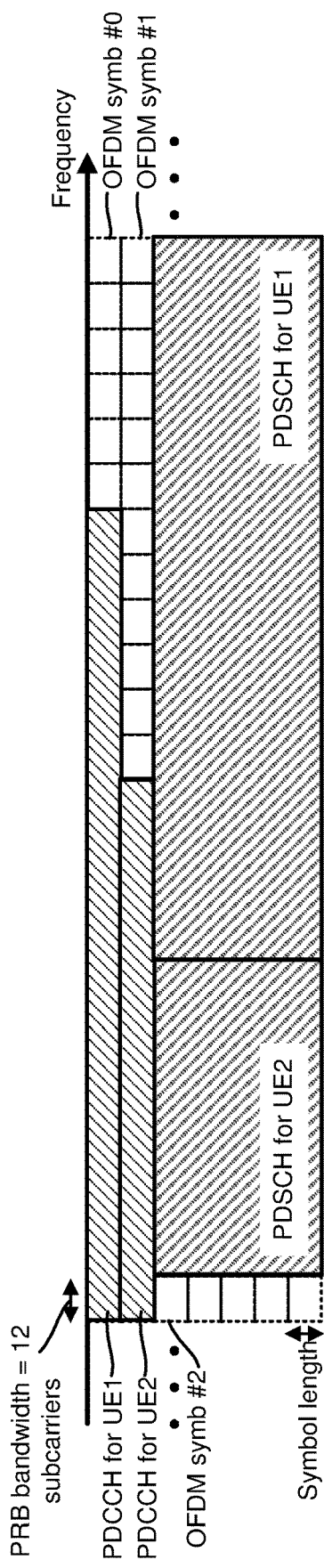
FIGS. 25A, 25B, and 25C illustrate examples of resource sharing within a control channel resource set between control channel and shared channel.
Figure 25B:
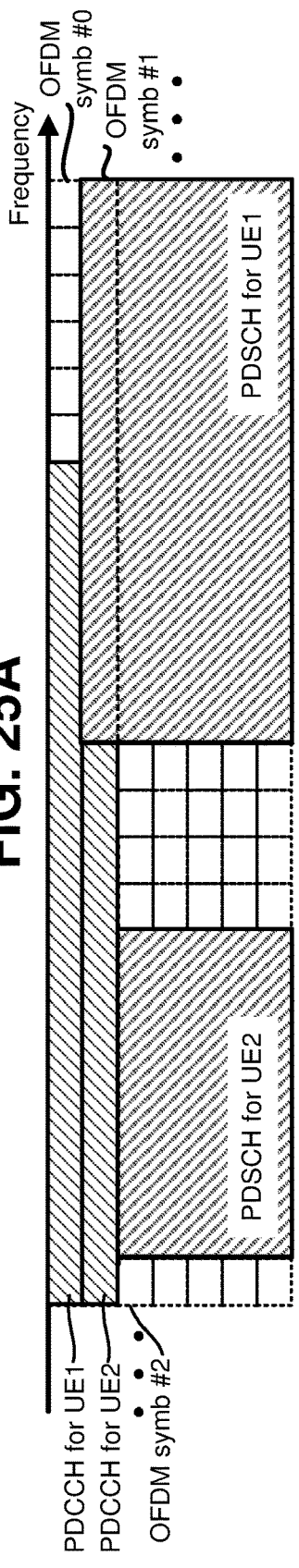
Figure 25C:
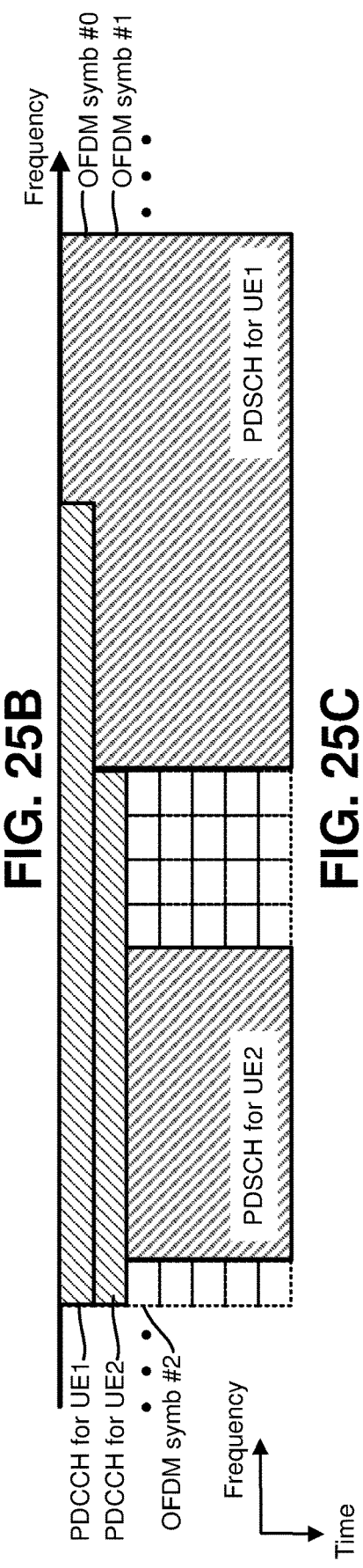

FIGS. 25A, 25B, and 25C illustrate examples of resource sharing within a control channel resource set between control channel and shared channel. PDCCHs for UE1 and UE2 (e.g., PDCCH1 and PDCCH2) schedule PDSCHs for UE1 and UE2 (e.g., PDSCH1 and PDSCH2), respectively. In this example, UE1 and UE2 are configured with the same control resource RB set. Moreover, the control resource set durations for both UE 1 and UE2 are set to 2 OFDM symbols. The DCI format carried by PDCCH1 may include an information field which indicates the starting position (e.g., an index of the starting OFDM symbol) of PDSCH1. The DCI format carried by PDCCH2 may also include an information field which indicates the starting position of PDSCH2.

The gNB 160 may set appropriate starting positions for PDSCHs such that PDSCHs do not collide with PDCCHs. In the case of FIG. 25A, PDSCH1 is set to start at OFDM symbol #2, so that it does not collide with PDCCH2 even if PDSCH1 is assigned with the same PRB as the one for PDCCH1. If PDCCH1 is not assigned with the other UE's PDCCH as shown in FIG. 25B, PDSCH1 may be able to start with an earlier timing. As shown in FIG. 25C, PDCCH1 may indicate the PDSCH1's starting position in such a way that PDSCH1 would be partially mapped on the REs on which the PDCCH1 was detected. In this case, the UE 102 may assume that PDSCH is not mapped to any resource element in OFDM symbol(s) of an RB when the OFDM symbol(s) of the RB is used for PDCCH transmission(s) detected by the UE 102. In the other RB, the UE 102 may assume that PDSCH starts with the starting position, which is indicated by the scheduling PDCCH. In other words, PDSCH starting positions may be different between a RB used by PDCCH transmission(s) and another RB not used by PDCCH transmission(s).

FIGS. 26A, 26B, and 26C illustrate examples of resource sharing between control channel and shared channel. The figure shows channels outside of the band defined by a control resource set as well as inside of the band. PDCCH for UE1 (e.g., PDCCH1) schedules PDSCH for UE1 (e.g., PDSCH1). In this example, the other UEs (e.g., UE2 and UE3) are configured with different control resource RB sets from the one for UE1. The DCI format carried by PDCCH1 may include an information field that indicates the starting position of PDSCH1. The information field may be a different one from the one for RB(s) inside of the control resource set, and this starting position may apply to RB(s) outside of the control resource set but may not apply to RB(s) inside of the control resource set. This information field may further indicate another starting position and which RBs each of the starting positions applies to.

Alternatively, the information field may be shared for both RBs inside and outside of the control resource set. In this case, the starting position indicated by the single field may apply to both RBs inside and outside of the control resource set. Yet alternatively, whether the information field is shared or not may be configured by higher layer signaling (e.g., dedicated RRC signaling).

As shown in FIG. 26A, the gNB 160 may set the starting position to OFDM symbol #0 if there is no other UE's PDCCH that collides with PDSCH1. The gNB 160 may set the starting position to an appropriate value so that PDSCH1 does not collide with the other UE's PDCCH as shown in FIG. 26B and FIG. 26C.

FIGS. 27A, 27B, and 27C illustrate examples of resource sharing between control channel and shared channel. The gNB 160 may send UE 102 a dedicated RRC configuration that configures one or more resource sets (e.g., R resource set(s)). A resource set is also referred to as a region, hereafter. For the resource set r, 0≤r<R, the configuration may include (a) a first OFDM symbol provided by higher layer parameter, (b) a number of consecutive OFDM symbols provided by higher layer parameter, and (c) a set of resource blocks provided by higher layer parameter. Granularity for each of these parameters may be the same as the granularity for CORESET configuration. A set of possible values for each of these parameters may be the same as or a subset of the set of possible values for CORESET configuration. Information element for a CORESET may be reused for the configuration of the resource set r. Alternatively or additionally, Q CORESET(s) may be counted as a part of R resource set(s), where Q≤R. For the resource set r, the configuration may also include information indicating associated value(s) of an availability indication field. A resource set may cover the CORESET configured for the UE102. The resource set r may or may not be available for PDSCH transmissions. The gNB 160 may be able to determine the availabilities of R resource sets, and the UE 102 may be able to know the availabilities of R resource sets by signaling from the gNB 160. If a part of the resource set r is used for PDCCH transmission to another UE, the gNB 160 may determine that the resource set r is not available for PDSCH transmission to the UE 102. If any part of the resource set r is not used for PDCCH transmissions to the other UEs, the gNB 160 may determine that the resource set r is available for PDSCH transmission to the UE 102. FIGS. 27A, 27B, and 27C show cases with three regions, Regions #0 to #2. In the case of FIG. 27A, all of the regions are available for PDSCH transmission for the UE102. In the case of FIG. 27B, all of the regions except Region #2 are available. In the case of FIG. 27C, only Region #0 is available. If the region covering a CORESET is available for PDSCH transmission and if the PDCCH scheduling the PDSCH is detected in the CORESET, the UE 102 may assume all REs in the region are available except for the REs occupied by the PDCCH. The UE 102 may also assume the REs occupied by another signal (e.g., CSI-RS, CSI-IM, PSS, SSS, PTRS) are not available even in the region available for PDSCH transmission.

A DCI format that schedules PDSCH may be utilized for the signaling of the availabilities. For example, a DCI format that schedules PDSCH may contain an information field (e.g., an availability indication field) that indicates the availabilities of R resource sets for the PDSCH transmission. To have full flexibility, the information field may include R bits, and each bit may correspond to each resource set r and may indicate whether or not the corresponding resource set is available for the PDSCH scheduled by the DCI (e.g., PDCCH). However, the information field does not necessarily include R bits. It may include x bits where x<R. Each (or a part) of $2^x$ states or values expressed by the x bits may correspond to a combination of the availabilities of R resource sets. The RRC configuration of the resource set r (and also CORESET q if it is a part of R resource sets) may contain $2^x$ bit (or less) Boolean information, and each of the bits may correspond to different value (e.g., 01, 10, 11 in case of x=2) indicated by the availability indication field. More specifically, the k-th bit (e.g., k-th Boolean information) for the resource set r may indicate whether or not the resource set r is available if the availability indication field indicates k-th value of the availability indication field. DCI formats mapped to USS may have the availability indication field only if configured. For example, dedicated RRC configuration may include information indicating whether or not DCI formats in USS contains the availability indication field. DCI formats mapped to CSS may not have the availability indication field irrespective of the RRC configuration. The CORESET containing CSS may be always unavailable for PDSCH transmissions irrespective of the availability configuration and/or the availability indication. One of $2^x$ states or values expressed by the x bits (e.g., 00 in case of x=2) may indicate that all of the R resource sets are available. Another one of $2^x$ states or values expressed by the x bits may indicate that all of the R resource sets are unavailable.

The value R may be a constant value. Alternatively, the value R may be configured via a dedicated RRC message. In this case, the bit size of the availability indication field, x, may be fixed. Alternatively, x may be given depending on the value R.

In the example shown in FIG. 27, a DCI format may indicate a single PDSCH starting position using a single starting position indication field. The PDSCH starting position may apply to both inside and outside of the CORESET. In FIG. 27, the field is assumed to indicate that PDSCH starting position is the first OFDM symbol of the subframe.

Figure 28:
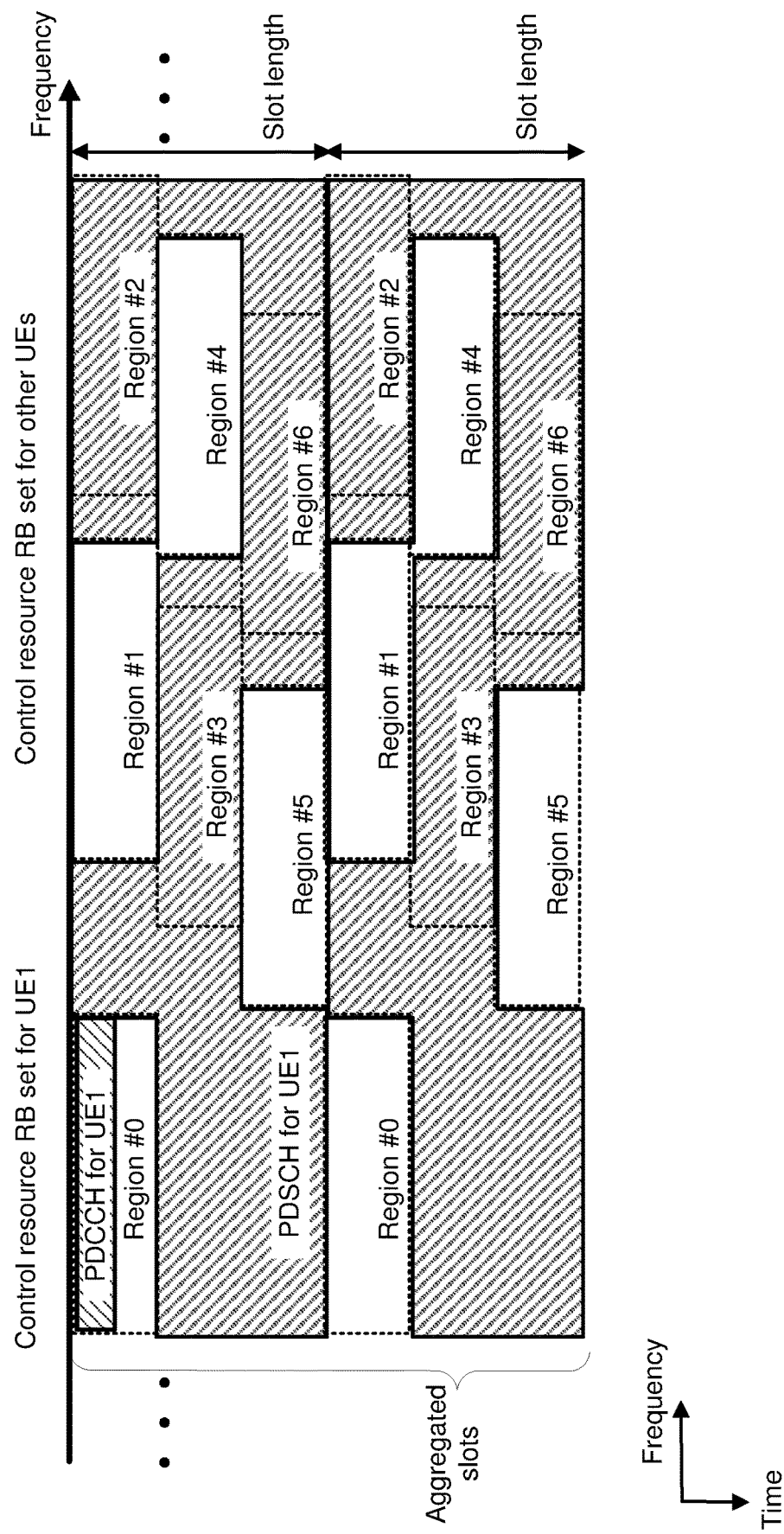
FIG. 28 illustrates another example of resource sharing between control channel and shared channel.

FIG. 28 illustrates another example of resource sharing between control channel and shared channel. The example in FIG. 28 may be an extension of the examples in FIGS. 27A, 27B, and 27C in terms of slot aggregation. In this example, the UE 102 is configured with 7 regions, Regions #0 to #6. A PDCCH schedules a PDSCH which is mapped to multiple slots. Alternatively, it can be said that a PDCCH schedules a PDSCH set which span multiple slots. The availability configuration and/or the availability indication by the PDCCH may apply to every slot where the scheduled PDSCH is mapped. For example, according to the availability configuration, Regions #0 to #6 may be defined in each one of the aggregated slots. If the availability indication in the PDCCH indicates Regions #2, #3 and #6 are available and Regions #0, #2, #4 and #5 are unavailable, those apply to Regions #0 to #6 in each one of the aggregated slots. Alternatively, the availability configuration and/or the availability indication by the PDCCH may apply to the first slot but may not apply to the other(s) of the aggregated slots. Yet alternatively, either dedicated RRC configuration or PDCCH may indicate one of the above alternatives. More specifically, either dedicated RRC configuration or PDCCH may include information which indicate whether the availability configuration and/or the availability indication by the PDCCH apply to all of the aggregated slot or apply to only some (e.g., the first slot) of the aggregated slot. If this information is included in the dedicated RRC configuration, it may be preferable that information element of slot aggregation contains this information.

Figure 29:
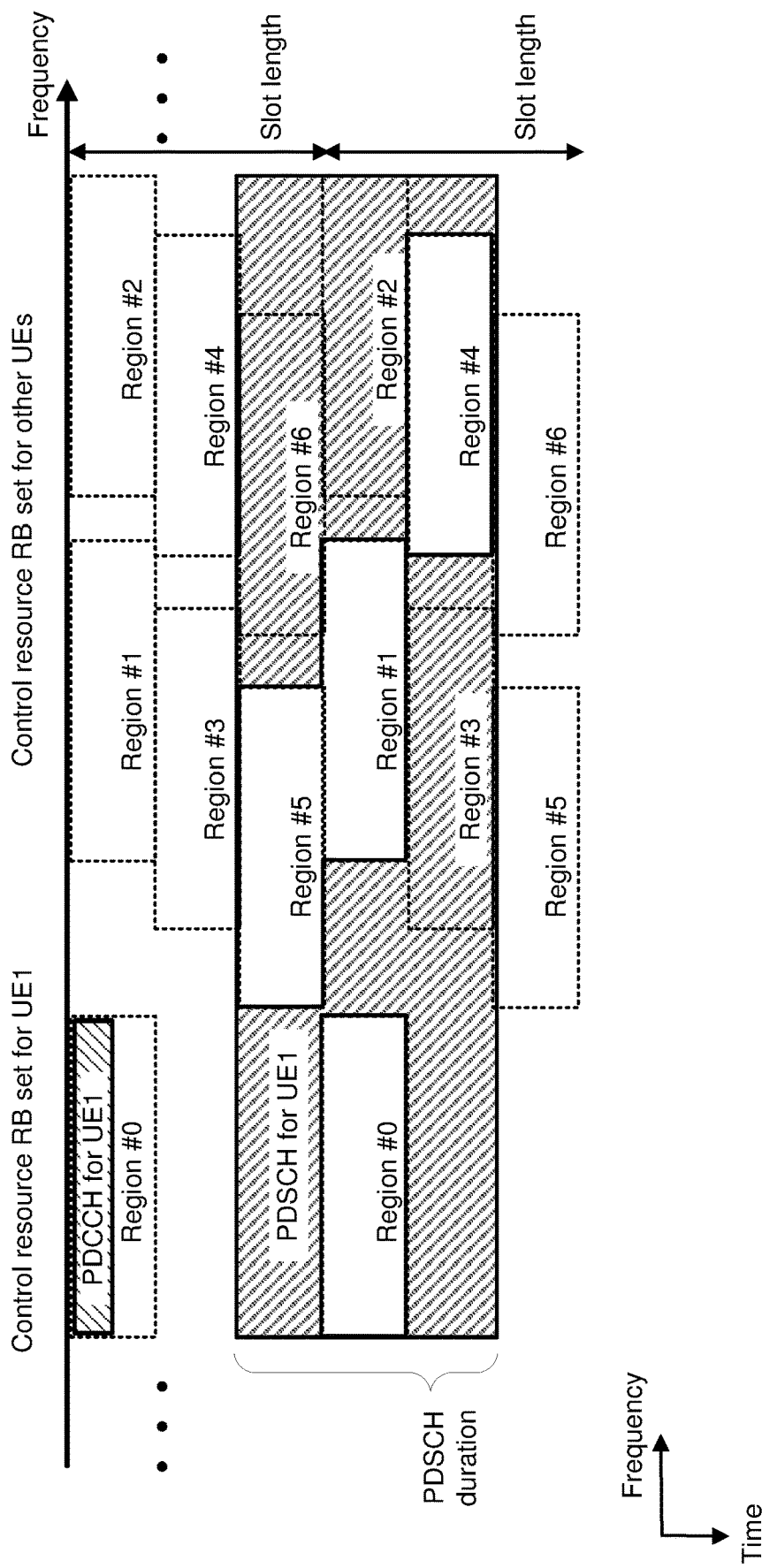
FIG. 29 illustrates another example of resource sharing between control channel and shared channel.
Figure 30:
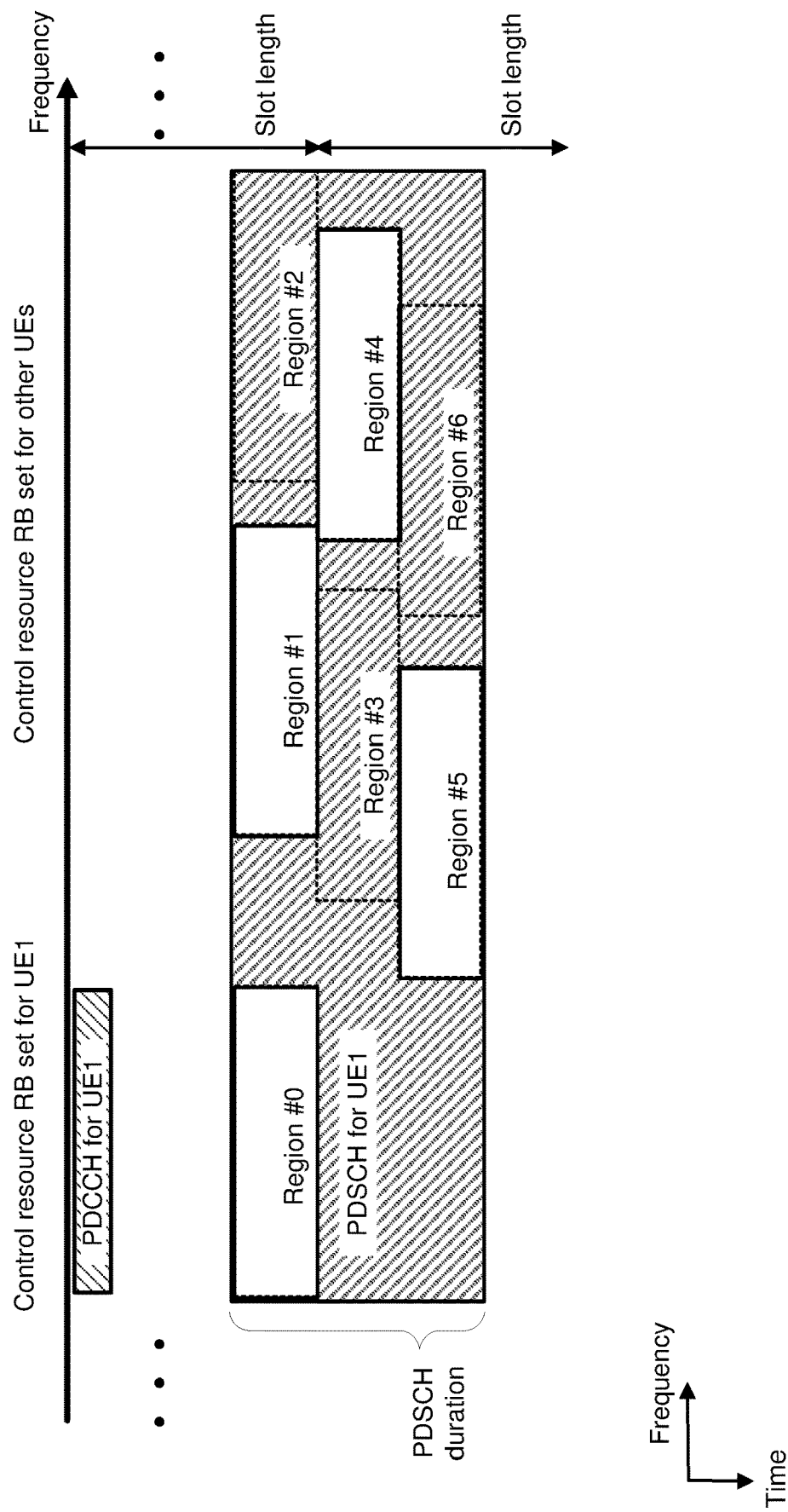
FIG. 30 illustrates another example of resource sharing between control channel and shared channel.

FIG. 29 illustrates another example of resource sharing between control channel and shared channel. The example in FIG. 29 may be an extension of the examples in FIGS. 27A, 27B, and 27C in terms of flexible PDSCH duration scheduling. In this example, the UE 102 is configured with 7 regions, Regions #0 to #6. Those regions may be defined in a slot. A PDCCH schedules a PDSCH by indicating a PDSCH starting position and a duration. Eventually, the PDSCH starts somewhere (e.g., at a middle) of a slot and ends somewhere (e.g., at a middle) of another slot. Similar to the example in FIG. 28, the availability configuration and/or the availability indication by the PDCCH may apply to every slot where the scheduled PDSCH is mapped. Alternatively, regions may be defined relatively to the PDSCH starting position. FIG. 30 illustrates another example of resource sharing between control channel and shared channel. In this case, the actual starting position of a given region may be given by at least the first OFDM symbol for the given region and the first OFDM symbol for the PDSCH.

In the examples shown in FIGS. 27A, 27B, 27C, 28 and 29, resource sets do not overlap with one another. However, the resource sets may be able to overlap to one another. In this case, the UE 102 may assume an RE is available if all regions covering the RE are available, and the UE 102 may assume an RE is unavailable if at least one region covering the RE is unavailable. It should be noted that potential available REs depend on resource assignment information, (e.g., frequency domain resource block assignment signaled via a scheduling DCI format, time domain PDSCH duration assignment signaled via a scheduling DCI format, time domain PDSCH starting position signaled via a scheduling DCI format, or a combination of those information.) Therefore, the UE 102 may assume the REs not indicated as a part of assigned resources are unavailable for the corresponding PDSCH transmission. It should be noted that availability of a resource for PDSCH transmission may mean that the UE 102 and gNB 160 assume the PDSCH is mapped to the resource.

A UE 102 is described. The UE 102 may comprise a higher layer processor which is configured to acquire a RRC configuration. The dedicated RRC configuration may comprise first information indicating R resource set(s). R may be a positive integer. The dedicated RRC configuration may further comprise second information indicating a configuration of r-th resource set among the R resource sets. 1≤r≤R. The UE 102 may also comprise PDCCH receiving circuitry which is configured to monitor a PDCCH carrying a DCI format which schedules a PDSCH. The UE 102 may further comprise PDSCH receiving circuitry which is configured to receive the PDSCH. The DCI format may comprise an information field indicating one of multiple values including K value(s). K may be a positive integer. The configuration of the r-th resource set may comprise K piece(s) of Boolean information. k-th Boolean information among the K piece(s) of Boolean information may indicate whether or not resource elements within the r-th resource set are available for the PDSCH in a case that the information field indicates k-th value among the K value(s).

A gNB 160 is described. The gNB 160 may comprise a higher layer processor which is configured to send a dedicated RRC configuration. The dedicated RRC configuration may comprise first information indicating R resource set(s). R may be a positive integer. The dedicated RRC configuration may further comprise second information indicating a configuration of r-th resource set among the R resource sets. 1≤r≤R. The gNB 160 may also comprise PDCCH transmitting circuitry which is configured to transmit a PDCCH carrying a DCI format which schedules a PDSCH. The gNB 160 may further comprise PDSCH transmitting circuitry which is configured to transmit the PDSCH. The DCI format may comprise an information field indicating one of multiple values including K value(s). K may be a positive integer. The configuration of the r-th resource set may comprise K piece(s) of Boolean information. k-th Boolean information among the K piece(s) of Boolean information may indicate whether or not resource elements within the r-th resource set are available for the PDSCH in a case that the information field indicates k-th value among the K value(s).

It should be noted that various modifications are possible within the scope of the present invention defined by claims, and embodiments that are made by suitably combining technical means disclosed according to the different embodiments are also included in the technical scope of the present invention.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment comprising:
a processor configured to acquire a dedicated radio resource control (RRC) configuration for a downlink slot aggregation and configured to monitor a physical downlink control channel (PDCCH) carrying a downlink control information (DCI) format which schedules a physical downlink shared channel (PDSCH); and
receiving circuitry configured to receive the PDSCH; wherein:
whether the PDSCH is (a) a PDSCH to which the downlink slot aggregation is applied or (b) a PDSCH to which the downlink slot aggregation is not applied is determined based on whether the PDCCH is (i) a PDCCH with Cyclic Redundancy Check (CRC) scrambled by a first type of radio network temporary identifier (RNTI) or (ii) a PDCCH with CRC scrambled by a second type of RNTI different from the first type of RNTI.

2. The user equipment of claim 1, wherein the first type of RNTI is a Cell-RNTI (C-RNTI), and the second type of RNTI is one of a System Information-RNTI (SI-RNTI) and a Paging-RNTI (P-RNTI).

3. The user equipment of claim 1, wherein the PDCCH with CRC scrambled by the first type of RNTI is monitored in a user-equipment search space (USS).

4. The user equipment of claim 1, wherein the first type of RNTI at least includes a Cell-RNTI (C-RNTI).

5. A method for a user equipment, the method comprising:
acquiring, through a processor, a dedicated radio resource control (RRC) configuration for a downlink slot aggregation;
monitoring, through the processor, a physical downlink control channel (PDCCH) carrying a downlink control information (DCI) format which schedules a physical downlink shared channel (PDSCH); and
receiving, through receiving circuitry, the PDSCH; wherein:
whether the PDSCH is (a) a PDSCH to which the downlink slot aggregation is applied or (b) a PDSCH to which the downlink slot aggregation is not applied is determined based on whether the PDCCH is (i) a PDCCH with Cyclic Redundancy Check (CRC) scrambled by a first type of radio network temporary identifier (RNTI) or (ii) a PDCCH with CRC scrambled by a second type of RNTI different from the first type of RNTI.

6. The method of claim 5, wherein the first type of RNTI is a Cell-RNTI (C-RNTI), and the second type of RNTI is one of a System Information-RNTI (SI-RNTI) and a Paging-RNTI (P-RNTI).

7. The method of claim 5, wherein the PDCCH with CRC scrambled by the first type of RNTI is monitored in a user-equipment search space (USS).

8. The method of claim 5, wherein the first type of RNTI at least includes a Cell-RNTI (C-RNTI).

9. A base station comprising:
a processor configured to send a dedicated radio resource control (RRC) configuration for a downlink slot aggregation;
transmitting circuitry configured to transmit a physical downlink control channel (PDCCH) carrying a downlink control information (DCI) format which schedules a physical downlink shared channel (PDSCH) and configured to transmit the PDSCH; wherein:
whether the PDSCH is (a) a PDSCH to which the downlink slot aggregation is applied or (b) a PDSCH to which the downlink slot aggregation is not applied is determined based on whether the PDCCH is (i) a PDCCH with Cyclic Redundancy Check (CRC) scrambled by a first type of radio network temporary identifier (RNTI) or (ii) a PDCCH with CRC scrambled by a second type of RNTI different from the first type of RNTI.

10. The base station of claim 9, wherein the first type of RNTI is a Cell-RNTI (C-RNTI), and the second type of RNTI is one of a System Information-RNTI (SI-RNTI) and a Paging-RNTI (P-RNTI).

11. The base station of claim 9, wherein the PDCCH with CRC scrambled by the first type of RNTI is transmitted, through the transmitting circuitry, in a user-equipment search space (USS).

12. The base station of claim 9, wherein the first type of RNTI at least includes a Cell-RNTI (C-RNTI).

13. A method for a base station, the method comprising:
sending, through a processor, a dedicated radio resource control (RRC) configuration for a downlink slot aggregation;
transmitting, through transmitting circuitry, a physical downlink control channel (PDCCH) carrying a downlink control information (DCI) format which schedules a physical downlink shared channel (PDSCH) and transmitting, through the transmitting circuitry, the PDSCH; wherein:
whether the PDSCH is (a) a PDSCH to which the downlink slot aggregation is applied or (b) a PDSCH to which the downlink slot aggregation is not applied is determined based on whether the PDCCH is (i) a PDCCH with Cyclic Redundancy Check (CRC) scrambled by a first type of radio network temporary identifier (RNTI) or (ii) a PDCCH with CRC scrambled by a second type of RNTI different from the first type of RNTI.

14. The method of claim 13, wherein the first type of RNTI is a Cell-RNTI (C-RNTI), and the second type of RNTI is one of a System Information-RNTI (SI-RNTI) and a Paging-RNTI (P-RNTI).

15. The method of claim 13, wherein the PDCCH with CRC scrambled by the first type of RNTI is transmitted, through the transmitting circuitry, in a user-equipment search space (USS).

16. The method of claim 13, wherein the first type of RNTI at least includes a Cell-RNTI (C-RNTI).

* * * * *